United States Patent
Alzahrani

(10) Patent No.: US 12,288,989 B2
(45) Date of Patent: Apr. 29, 2025

(54) BOOST CONVERTER SYSTEM

(71) Applicant: NAJRAN UNIVERSITY, Najran (SA)

(72) Inventor: Ahmad Alzahrani, Najran (SA)

(73) Assignee: NAJRAN UNIVERSITY, Najran (SA)

( * ) Notice: Subject to any disclaimer, the term of this patent is extended or adjusted under 35 U.S.C. 154(b) by 43 days.

(21) Appl. No.: 18/158,637

(22) Filed: Jan. 24, 2023

(65) Prior Publication Data

US 2024/0275173 A1 Aug. 15, 2024

(51) Int. Cl.
  *H02J 3/38* (2006.01)
  *H02J 3/32* (2006.01)
  *H02M 3/158* (2006.01)
  *H02M 1/42* (2007.01)

(52) U.S. Cl.
  CPC .............. *H02J 3/381* (2013.01); *H02J 3/32* (2013.01); *H02M 3/1586* (2021.05); *H02J 2207/20* (2020.01); *H02J 2207/50* (2020.01); *H02J 2300/26* (2020.01); *H02M 1/42* (2013.01)

(58) Field of Classification Search
  CPC .......... H02J 3/381; H02J 3/32; H02J 2207/20; H02J 2207/50; H02J 2300/26; H02J 2300/24; H02M 3/1586; H02M 1/42; H02M 1/007; H02M 1/008; H02M 1/0095; H02M 1/10
  See application file for complete search history.

(56) References Cited

U.S. PATENT DOCUMENTS

2017/0054364 A1* 2/2017 Ferdowsi ............ H02M 3/1584

OTHER PUBLICATIONS

Ahmad Alzahrani, "A Hybrid DC-DC Quadrupler Boost Converter for Photovoltaic Panels Integration into a DC Distribution System", Electronics, vol. 9, No. 1965, Nov. 20, 2020, pp. 1-18 (Year: 2020).*
Ahmad Alzahrani, et al., "Interleaved Multistage Step-Up Topologies with Voltage Multiplier Cells", Energies, vol. 13, No. 5990, Nov. 17, 2020, pp. 1-18 (Year: 2020).*
Ahmad Alzahrani, et al., "Interleaved Multistage Step-Up Topologies with Voltage Multiplier Cells", Energies, vol. 13, No. 5990, Nov. 17, 2020, pp. 1-18.

(Continued)

*Primary Examiner* — Jared Fureman
*Assistant Examiner* — Michael J Warmflash
(74) *Attorney, Agent, or Firm* — Oblon, McClelland, Maier & Neustadt, L.L.P.

(57) ABSTRACT

A boost converter system including a power source, an inductor stage, and a voltage multiplication stage. The power source outputs a first direct current (DC) to the inductor stage. The inductor stage includes a plurality of diodes and a plurality of inductors. The inductor stage includes a first switched inductor cell and a second switched inductor cell. The first switched inductor cell is wired to a first metal-oxide-semiconductor field-effect transistor (MOSFET). The first MOSFET is wired to the voltage multiplication stage. The second switched inductor cell is wired to a second MOSFET. The second MOSFET is wired to the voltage multiplication stage. The voltage multiplication stage receives a first DC current from the first MOSFET and the second MOSFET. The voltage multiplication stage includes at least one voltage multiplier cell (VMC). The VMC includes a plurality of diodes and plurality of capacitors.

20 Claims, 21 Drawing Sheets

(56) References Cited

OTHER PUBLICATIONS

Ahmad Alzahrani, "A Hybrid DC-DC Quadrupler Boost Converter for Photovoltaic Panels Integration into a DC Distribution System", Electronics, vol. 9, No. 1965, Nov. 20, 2020, pp. 1-18.

Kuo-Ching Tseng, et al., "High Step-Up High-Efficiency Interleaved Converter With Voltage Multiplier Module for Renewable Energy System", IEEE Transactions on Industrial Electronics, vol. 61, Issue 3, May 1, 2013, pp. 1311-1319 (Abstract only).

* cited by examiner

BOOST CONVERTER SYSTEM

STATEMENT REGARDING PRIOR DISCLOSURES BY THE INVENTOR(S)

Aspects of this technology are described by Alzahrani, A. Interleaved Switched-Inductor Boost Converter for Photovoltaic Energy Application, in Arab J Sci Eng (2022). doi.org/10.1007/s13369-022-07392-2.

STATEMENT OF ACKNOWLEDGEMENT

The support of Najran University is gratefully acknowledged.

BACKGROUND

Technical Field

The present disclosure is directed to a boost converter system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With global population growth, energy demand is increasing to meet the population's basic needs. Renewable energy sources (RESs), such as solar energy, fuel cells, wind energy, are preferable over non-renewable energy sources (fossil fuels) and have become the mainstream of development. The solar energy is converted into electrical energy using a photovoltaic (PV) system. PV systems are modular, easy to install, and they provide the possibility of sending the generated excess energy to a utility grid. In the PV system, several power electronics conversion circuits such as Direct Current (DC)-DC converters, Alternating Current (AC)-DC converters, and dual-converters are required to optimize the energy produced for the effective and efficient use of PV systems.

PV cells and fuel cells generate low voltage as input. DC-to-DC converters are used to modify the voltage, current, and/or power of an input DC signal relative to an output DC signal. For example, step-up converter (boost converter), receives an input DC voltage from the PV cells and provides a higher output DC voltage. The DC-to-DC converters are used in several types of equipment including, for example, in power supplies to modify and/or condition power provided to DC loads such as, for example, computers, mobile phones and other mobile computing devices, etc. The DC-to-AC inverters receive a DC input voltage and provide an AC output voltage.

Residential PV systems utilize string inverters or micro-inverters to convert DC power to AC power. The string converters do not perform well with shaded PV modules, and that can significantly reduce the output power. The micro-inverters can mitigate the issue of partial shadings and process the power efficiently. However, the micro-inverters require the input voltage to be around 200-400 Vdc or higher to be able to invert the dc voltage to 120 Vac. The majority of PV panels typically have an output voltage ranges between 10-40V, and this range is very low for the micro-inverter input.

Therefore, a step-up converter is essential that is able to boost the voltage from 20V to 400 V or higher. A conventional boost converter (CBC) or a three-level boost converter is not suitable for such applications because the converter has to be controlled at an extremely high-duty cycle to attain a high voltage gain ratio. The CBC requires a sizable coil to remain in a continuous conduction mode (CCM) and suffers from the potential stress on both the output diode and the controlled switch. Another existing isolated dc-dc converter has a voltage gain with a direct relationship to the turn ratio, and hence, the high output voltage can be attained by adding turns. The conventional isolated converters have discontinuous input current and suffer from the high potential stress on components. Moreover, utilizing a transformer or coupled inductors reduces the energy density and increases the converters' weight and size.

A conventional non-isolated step-up converter has high gain by employing a low-side and a high-side MOSFET switching at the same frequency with the same duty cycles and another low-side MOSFET switch at a different duty ratio. Although the converter has a higher voltage gain than the CBC, the potential stress on components is high, and the potential stress on the output is higher than the potential stress on the output diode of the CBC. Further, a switched-inductor boost converter boosts the voltage by charging the coils in parallel and discharging them in series. However, at the operating frequency of such a converter, the input current varies significantly. The switched-inductor diodes' losses are high because they are in the high-current loop, which might require larger heat dissipation devices. Also, the conventional single-phase switched-inductor converters have significant ac ripples on the input current, therefore requiring large capacitor filters.

Accordingly, it is one object of the present disclosure is to provide a boost converter system that reduces potential stress on switching elements and optimizes the system's design to achieve high voltage gain by connecting additional voltage multipliers or switched-inductor cells.

SUMMARY

In an exemplary embodiment, a boost converter system is disclosed. The system includes a power source, an inductor stage, and a voltage multiplication stage. The power source outputs a first direct current (DC) to the inductor stage. The inductor stage includes a plurality of diodes and a plurality of inductors. The plurality of diodes and the plurality of inductors are arranged in series. The inductor stage includes a first switched inductor cell and a second switched inductor cell. The first switched inductor cell is wired to a first metal-oxide-semiconductor field-effect transistor (MOSFET). The first MOSFET being wired to the voltage multiplication stage. The first DC current passing through the first switched inductor cell and across the first MOSFET. The second switched inductor cell being wired to a second MOSFET. The second MOSFET being wired to the voltage multiplication stage. The first DC current passing through the second switched inductor cell and across the second MOSFET. The voltage multiplication stage receiving the first DC current from the first MOSFET and the second MOSFET. The voltage multiplication stage includes at least one voltage multiplier cell (VMC). The VMC includes a plurality of diodes and plurality of capacitors. The plurality of diodes and the plurality of capacitors being wired in parallel. The first DC current passing through the plurality of diodes to the plurality of capacitors. The first DC current creating a voltage charge in the plurality of capacitors. The plurality of capacitors storing the voltage charge. The voltage charge generates a second DC current. The plurality of capacitors passing the second DC current to a grounded output. The grounded output comprises an output capacitor and a resistor. The voltage charge being stored on the output capacitor.

In another exemplary embodiment, a DC/DC power converter providing a voltage gain is disclosed. The DC/DC power converter includes a self-lift cell and a plurality of VMC. The self-lift cell performs a first storing sequence in a first mode according to a first out-of-phase driving signal and a second out-of-phase driving signal. The self-lift cell comprises a first loop and a second loop. The first storing sequence storing power in the first loop and the second loop. The self-lift cell includes a plurality of inductors and a plurality of diodes. The self-lift cell performing a second storing sequence and a first discharging sequence in a second mode according to the first out-of-phase driving signal and the second out-of-phase driving signal. The second storing sequence storing power in the second loop. The plurality of VMC includes a plurality of capacitors and a plurality of diodes. The plurality of VMC being electronically connected with the self-lift cell. The plurality of VMC receives power from the first discharging sequence of the self-lift cell. The plurality of VMC being electronically wired to a grounded output. The plurality of VMC performing a second discharging sequence. The grounded output receives power from the second discharging sequence of the plurality of VMC. The grounded output performing a charging sequence. The grounded output storing the power of the plurality of VMC in the charging sequence. The self-lift cell performing a third storing sequence and a third discharging sequence in a third mode according to the first out-of-phase driving signal and the second out-of-phase driving signal. The plurality of VMC receives power from the third discharging sequence of the self-lift cell. The third storing sequence storing power in the first loop.

In another exemplary embodiment, a system for providing power to a DC network is disclosed. The system includes a DC power system, a power converter system and a DC distribution system. The DC power system includes a plurality of DC generation units providing generated power via an output terminal disposed on each of the DC generation units. The power converter system includes a plurality of boost power converter units. The power converter system receives power from the plurality of DC generation units connected to the output terminal. The DC distribution system includes a linked network configured to distribute power from the power converter system to the DC network.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
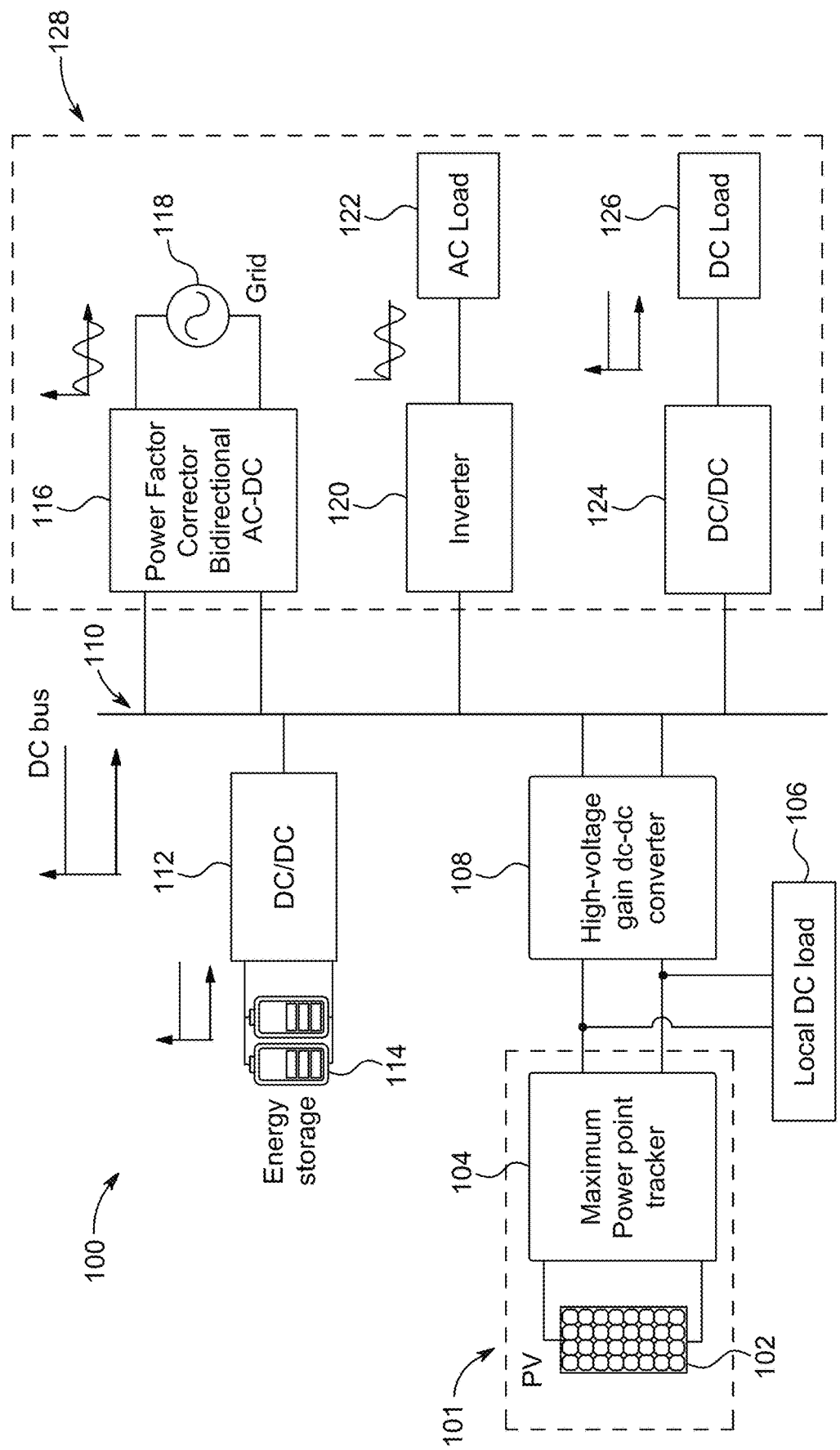
FIG. 1 illustrates a system for providing power to a DC network, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a DC/DC power converter for providing a voltage gain. The DC/DC power converter is designed for use in electrical applications requiring significant voltage gains, such as connecting photovoltaic energy sources to a direct current distribution bus or a microgrid. The DC/DC power converter includes an interleaved switched-inductor stage attached to a plurality of voltage multiplier cells (VMC) stages. The interleaved switched-inductor boost stage includes two switched-inductor phases controlled by two out-of-phase controllable switches. The switched-inductor stage can be fed by a single or multiple self-controlled input power sources. The VMC stage includes a plurality of diodes and a plurality of capacitors to raise the power converter's voltage gain. In an aspect, the DC/DC power converter was simulated to determine its performance of the DC/DC power converter. The DC/DC power converter is configured to convert 20.0 V from an input voltage source to a 400.0 V output load.

FIG. 1 illustrates a system for providing power to a DC network, according to aspects of the present disclosure (hereinafter interchangeably referred to as "system 100"). As shown in FIG. 1, the system 100 includes a DC power system 101, a power converter system 108, a point of common coupling (PCC) 110, an energy storage system 114, and a DC distribution system 128. The system 100 (also referred to as a microgrid 100) is a local energy system which incorporates three key modules that include: generation of electricity, storage of electricity and providing electricity on demand to the plurality of loads.

The DC power system 101 includes a plurality of DC generation units 102 and a maximum power point tracker 104. In an example, the plurality of DC generation units 102 includes, but is not limited to, a plurality of photovoltaic panel arrays, a plurality of wind power turbines, a plurality of wave generators, and such naturally available resources. The plurality of DC generation units 102 is configured to generate an electric current. In an aspect, each of the DC generation units 102 includes an output terminal. The plurality of DC generation units 102 is configured to provide generated power via the output terminal disposed on each of the DC generation units 102. During a sunny day, a number of DC generation units 102 supply power to a local DC load 106, and excess energy is supplied to the DC distribution system 128. In an aspect, the system 100 includes a power controller (not shown) that is configured to determine whether to charge the energy storage system 114 or convert the power into AC and feed the DC distribution system 128.

The maximum power point tracker 104 is configured to employ a maximum power point tracking (MPPT) algorithm. In an aspect, the MPPT algorithm is implemented in a plurality of inverters coupled with the plurality of DC generation units 102. For example, the MPPT algorithm is configured to continuously adjust an impedance of the PV array to keep the PV array operating at, or close to, the peak power point of the PV array under varying conditions, like changing solar irradiance, temperature, and load. The MPPT algorithm controls the voltage to ensure that the system operates at "maximum power point" (or peak voltage) on a power voltage curve.

In an aspect, the plurality of DC generation units 102 are connected in series, however, the shading severely affects the performance of the serially connected plurality of DC generation units 102. Therefore, the plurality of DC generation units 102 are connected in a parallel configuration to overcome the effect of the shading. A single PV is a low-voltage source, generally between 12-40 V. Therefore, a dc-dc converter with sufficient voltage gain is required to distribute the power generated by a PV array in an efficient way.

The energy storage system 114 includes a plurality of rechargeable battery packs and a controller. The energy storage system 114 is configured to store energy and discharge the stored energy for use in satisfying an energy load of a building, a group of buildings, or a central plant. In an aspect, the plurality of rechargeable battery packs includes lead-acid, lithium-iron, lithium-ion, nickel-cadmium, sodium-sulfur, sodium-nickel, or a combination thereof. The energy storage system (ESS) 114 includes a DC-DC converter 112 that converts a direct current (DC) from one voltage level to another level. The DC-DC converter 112 is configured to produce a voltage that is regulated and consistent.

The power converter system 108 includes a plurality of boost power converter units. The power converter system is connected to the output terminal of the plurality of DC generation units 102 and receives power from the plurality of DC generation units 102. Each of the boost power converter units includes a power source, an inductor stage, and a voltage multiplication stage.

The power source is configured to output a first direct current (DC) to the inductor stage. In an aspect, the first DC lies in a range of 10 volts and 40 volts.

The inductor stage includes a plurality of diodes and a plurality of inductors. The plurality of diodes and the plurality of inductors are connected in a series configuration. The inductor stage includes a first switched inductor cell and a second switched inductor cell. The first switched inductor cell is connected to a first metal-oxide-semiconductor field-effect transistor (MOSFET). The first MOSFET is further connected to the voltage multiplication stage.

The first DC current passes through the first switched inductor cell and across the first MOSFET. The second switched inductor cell is connected to a second MOSFET. The second MOSFET is connected to the voltage multiplication stage. The first DC current passes through the second switched inductor cell and across the second MOSFET. The voltage multiplication stage receives the first DC current from the first MOSFET and the second MOSFET.

The voltage multiplication stage includes at least one voltage multiplier cell (VMC). The VMC includes a plurality of diodes and a plurality of capacitors. The plurality of diodes and the plurality of capacitors are parallelly connected. The first DC current passes through the plurality of diodes to the plurality of capacitors. The first DC current creates a voltage charge in the plurality of capacitors. The plurality of capacitors stores the voltage charge. The voltage charge generates a second DC current. The plurality of capacitors passes the second DC current to a grounded output. The grounded output includes an output capacitor and a resistor. The voltage charge is stored on the output capacitor.

The DC distribution system 128 includes a linked network that is configured to distribute power from the power converter system to the DC network. In an aspect, the DC network includes a grid 118, a plurality of AC load 122, and a plurality of DC load 126.

In an aspect, the PCC 110 is a point at which the energy storage system 114 is interfaced with the power converter system 108 and the DC distribution system 128. In an example, the PCC 110 is a 200-600 V DC bus. In an aspect, DC buses are preferable as they have high power quality, reduced cost, lower number of conversion units, and no need for synchronization. The DC buses can be fed from both AC source and DC source. For an AC source, a power factor correction (PFC) bidirectional AC-DC converter is required that processes the AC power from the grid 118 to the bus and vice versa. On the other hand, the DC bus can be connected to the DC source through a conventional dc-dc converter, like series-connected batteries.

The grid 118 is connected to the PCC 110 via the power factor corrector bidirectional AC-DC converter 116. The bidirectional AC-DC converter improves power factor and reduces harmonic magnitude and disturbance to the supply by the system. The bidirectional AC-DC converter 116 allows recovery of regenerative energy of loads, back to the power supply and the converter.

Endpoints of the system 100 are consumer locations where electricity is used to power various equipment such as lighting equipment, television devices, dishwasher equipment, or such equipment (acting as a plurality of loads 122, 126 for the system 100). In an example, the DC load 126 is connected to the PCC 110 via the DC-DC converter 124. In another example, the AC load 122 is connected to the PCC 110 via an inverter (DC-AC converter) 120 that converts DC (direct current) to AC (alternating current).

In an operational aspect, during a sunny day, the DC power system 101 (PV panels) is configured to generate maximum power as output. The primary objective of the DC power system 101 is to deliver power to the local DC load 106. In the event of excessive power generation, the DC power system 101 is setup to either supply excess energy to the microgrid or store excess power in the ESS. In the system, the power controller decides to either charge the ESS or convert the power into AC and feed the main electric grid. On the other hand, during cloudy days or if the DC power system 101 is shaded, the local DC load 106, connected directly to the PV panel, will be fed by either the energy storage system 114 or the main grid 118.

FIG. 2A-FIG. 2D illustrate various configurations of a boost converter system 200, according to aspects of the present disclosure.

Referring to FIG. 2A-FIG. 2D, the boost converter system 200 includes a power source 202, an inductor stage 204, and a voltage multiplication stage 208.

The power source 202 is configured to output a first direct current (DC) to the inductor stage 204. In an aspect, the power source 202 is connected to the DC power system (the plurality of DC generation units) and receives the direct current (DC) from the DC power system. In an example, the power source 202 includes a photovoltaic generator and a plurality of wind power generation units. In an operative aspect, the power source 202 includes at least one photovoltaic panel. The photovoltaic panel is wired to the inductor stage. In an example, the power source 202 is configured to generate a voltage output in a range of 10 volts and 40 volts. In an aspect, the boost converter system is configured to provide a voltage gain of at least 400 volts.

The inductor stage 204 includes a first switched inductor cell 204a and a second switched inductor cell 204b. In an operative aspect, the first switched inductor cell 204a and the second switched inductor cell 204b are wired in parallel to the power source 202. In another operative aspect, the first switched inductor cell 204a and the second switched inductor cell 204b are wired in series to the power source 202. In an example, the inductor stage 204 includes a plurality of non-isolated inductor cells.

Each of the switched inductor cells 204a, 204b includes a plurality of diodes and a plurality of inductors. The plurality of diodes and the plurality of inductors are arranged in series. In an operative aspect, the first switched inductor cell 204a is coupled to a first metal-oxide-semiconductor field-effect transistor (MOSFET) 206a. The first MOSFET 206a is connected to the voltage multiplication stage 208. The power source 202 is configured to pass the first DC current through the first switched inductor cell and across the first MOSFET 206a. The second switched inductor cell 204b is coupled to a second MOSFET 206b. The second MOSFET 206b is also connected to the voltage multiplication stage 208. The power source 202 is configured to pass the first DC current through the second switched inductor cell 204b and across the second MOSFET 206b.

The voltage multiplication stage 208 is configured to receive the first DC current from the first MOSFET 206a and the second MOSFET 206b, respectively. The voltage multiplication stage 208 is configured to produce a voltage gain (an output voltage many times greater than the applied input voltage). The voltage multiplication stage 208 includes at least one voltage multiplier cell (VMC).

The VMC includes a plurality of diodes and a plurality of capacitors. The plurality of diodes and the plurality of capacitors are connected in parallel. The first DC current passes through the plurality of diodes to the plurality of capacitors. The first DC current creates a voltage charge in the plurality of capacitors. The plurality of capacitors is configured to store the voltage charge. The stored voltage charge generates a second DC current. In an aspect, the plurality of capacitors is configured to pass the second DC current to a grounded output 210. The grounded output 210 includes an output capacitor and a resistor. The output capacitor is configured to store the voltage charge. In an operative aspect, the grounded output passes the second DC current to a plurality of micro-inverters.

In an aspect, the inductor stage 204 and the voltage multiplication stage 208 are interleaved. The VMC is connected in series to the inductor stage 204.

In a structural aspect, the boost converter system 200 is configured to convert the energy from either single or multiple independent sources to generate an output with high voltage gain. The boost converter system 200 may have a floating output 210a or the grounded output 210.

Figure 2A:
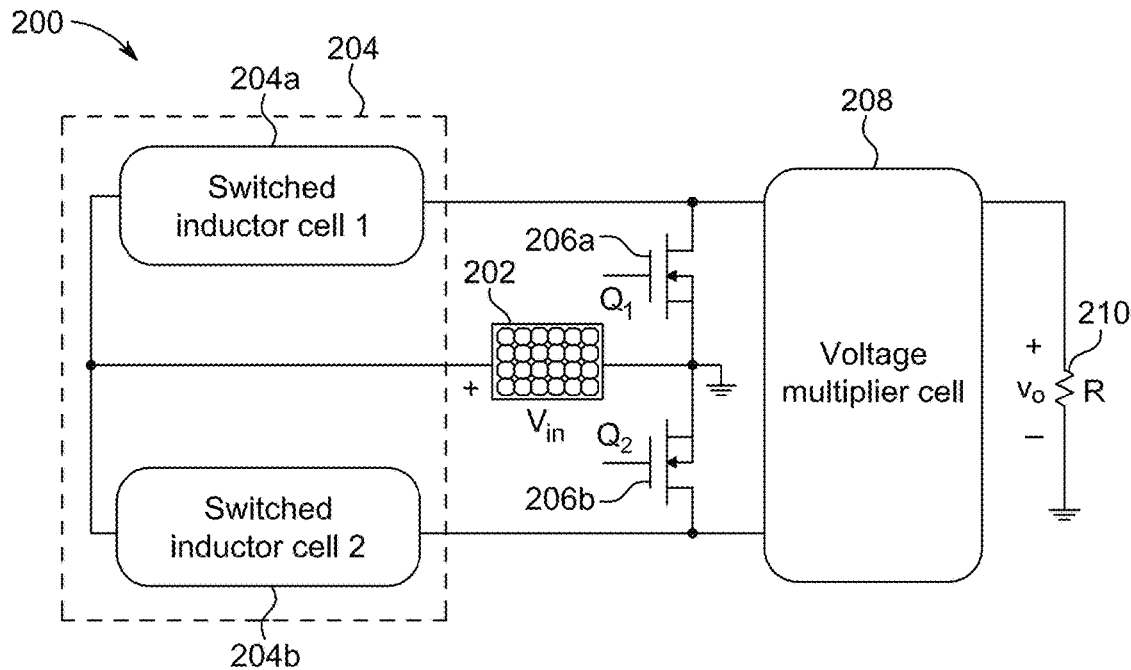
FIG. 2A illustrates a boost converter system having a single input power supply and a grounded output, according to aspects of the present disclosure.

FIG. 2A illustrates the boost converter system 200 having a single input power source 202 and the grounded output 210, according to aspects of the present disclosure.

Figure 2B:
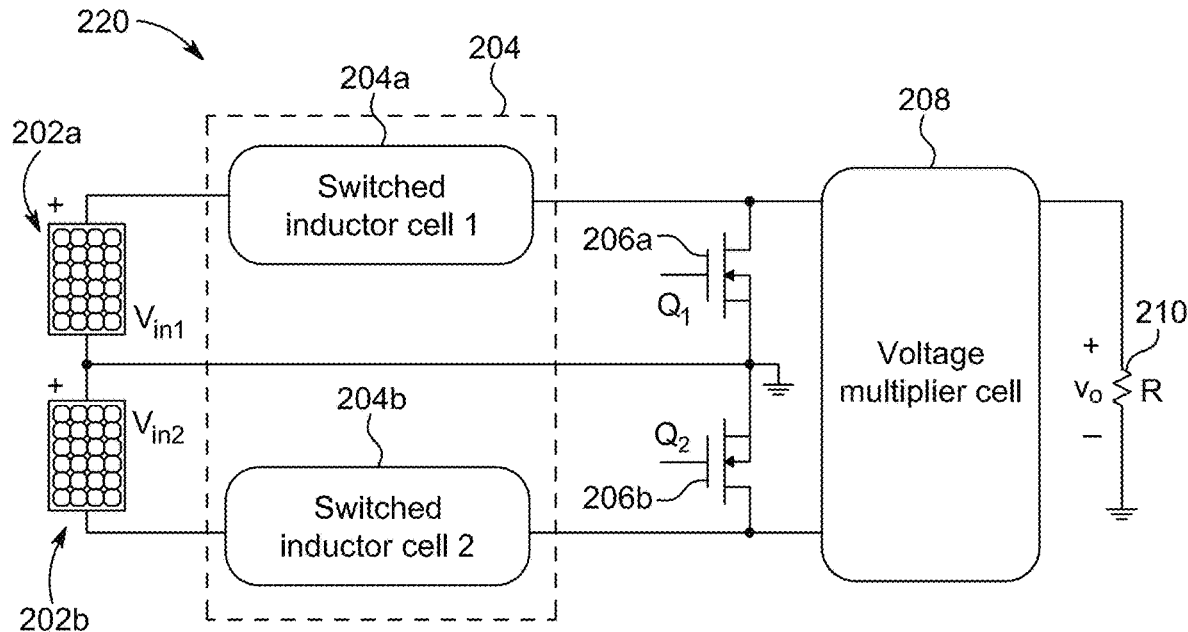
FIG. 2B illustrates a boost converter system having a dual input power supply and a grounded output, according to aspects of the present disclosure.

FIG. 2B illustrates a boost converter system 200 having a dual input power supply and the grounded output, according to aspects of the present disclosure. As shown in FIG. 2B, the boost converter system 200 has dual input power supply 202a, and 202b. In an aspect, each of the dual input power supply 202a, 202b is configured to connect to the DC power system (the plurality of DC generation units) and receives the direct current (DC) from the DC power system. In an example, each of the dual input power supply 202a, 202b is connected to either a same power source 202 or different power source 202. The boost converter system 200 includes the grounded output 210.

Figure 2C:
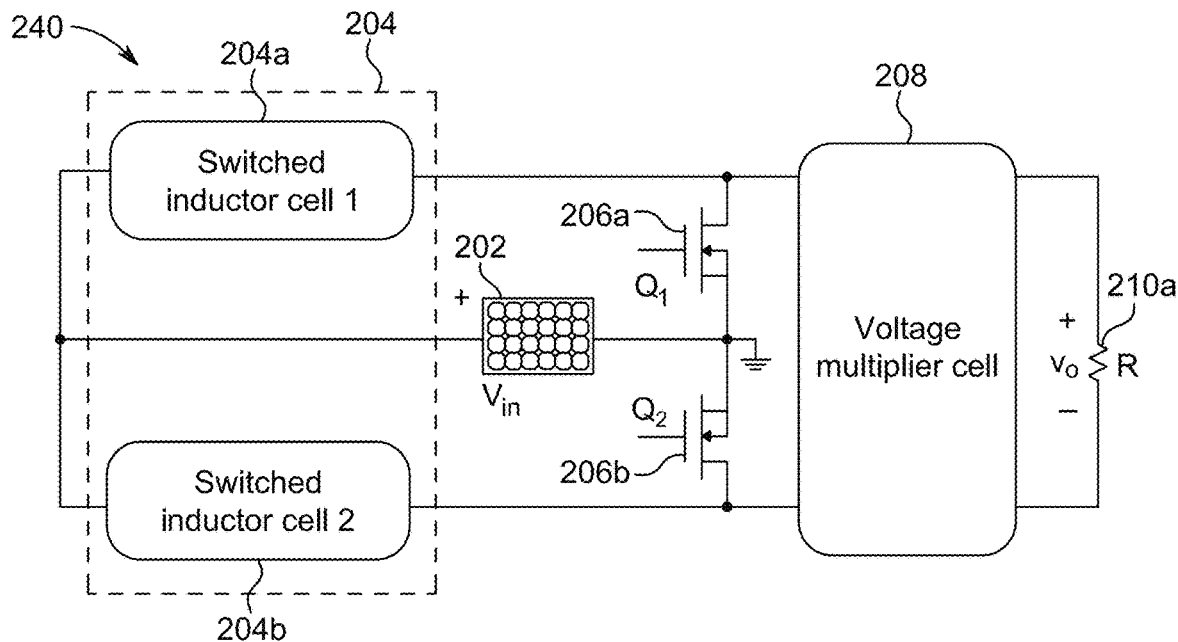
FIG. 2C illustrates a boost converter system having the single input power supply and a floating output, according to aspects of the present disclosure.

FIG. 2C illustrates a boost converter system 200 having the single input power supply and the floating output, according to aspects of the present disclosure. As shown in FIG. 2C, the boost converter system 200 has single input power source 202. The boost converter system includes a floating output 210a. In an aspect, the floating output 210a is a power supply or DC/DC output that is ungrounded and not referenced to another output.

Figure 2D:
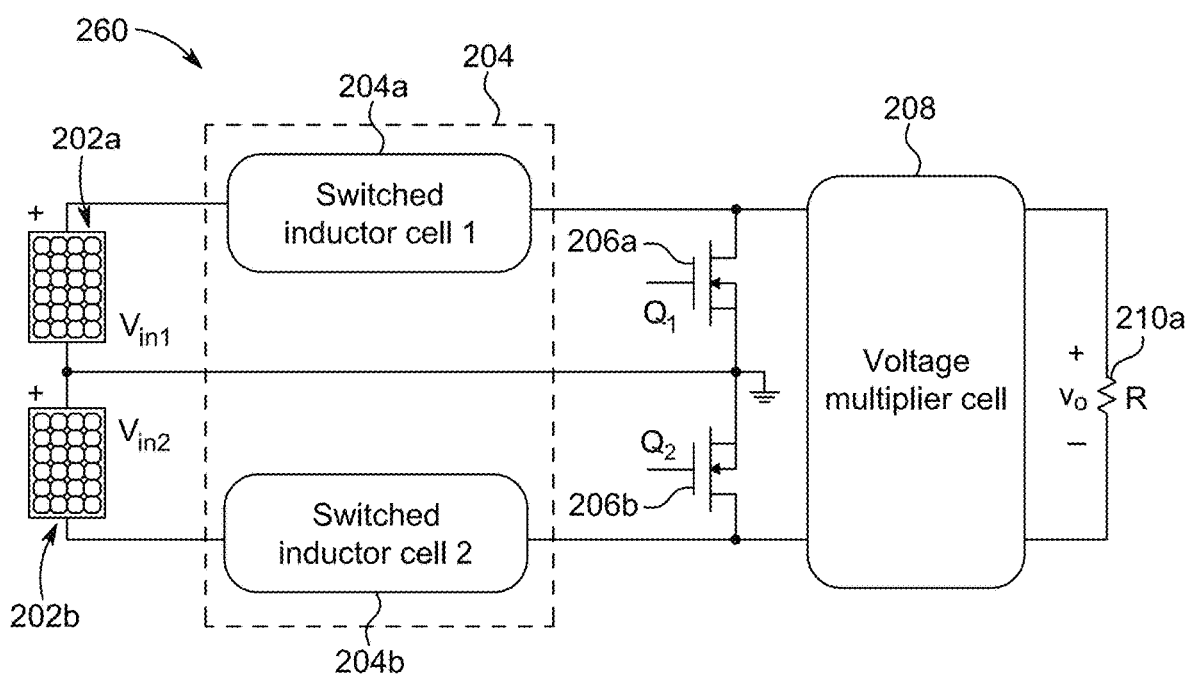
FIG. 2D illustrates a boost converter system having the dual input power supply and the floating output, according to aspects of the present disclosure.

FIG. 2D illustrates a boost converter system 200 having the dual input power supply and the floating output, according to aspects of the present disclosure. As shown in FIG. 2D, the boost converter system 200 has dual input power supply 202a, 202b and the floating output 210a.

Figure 3:
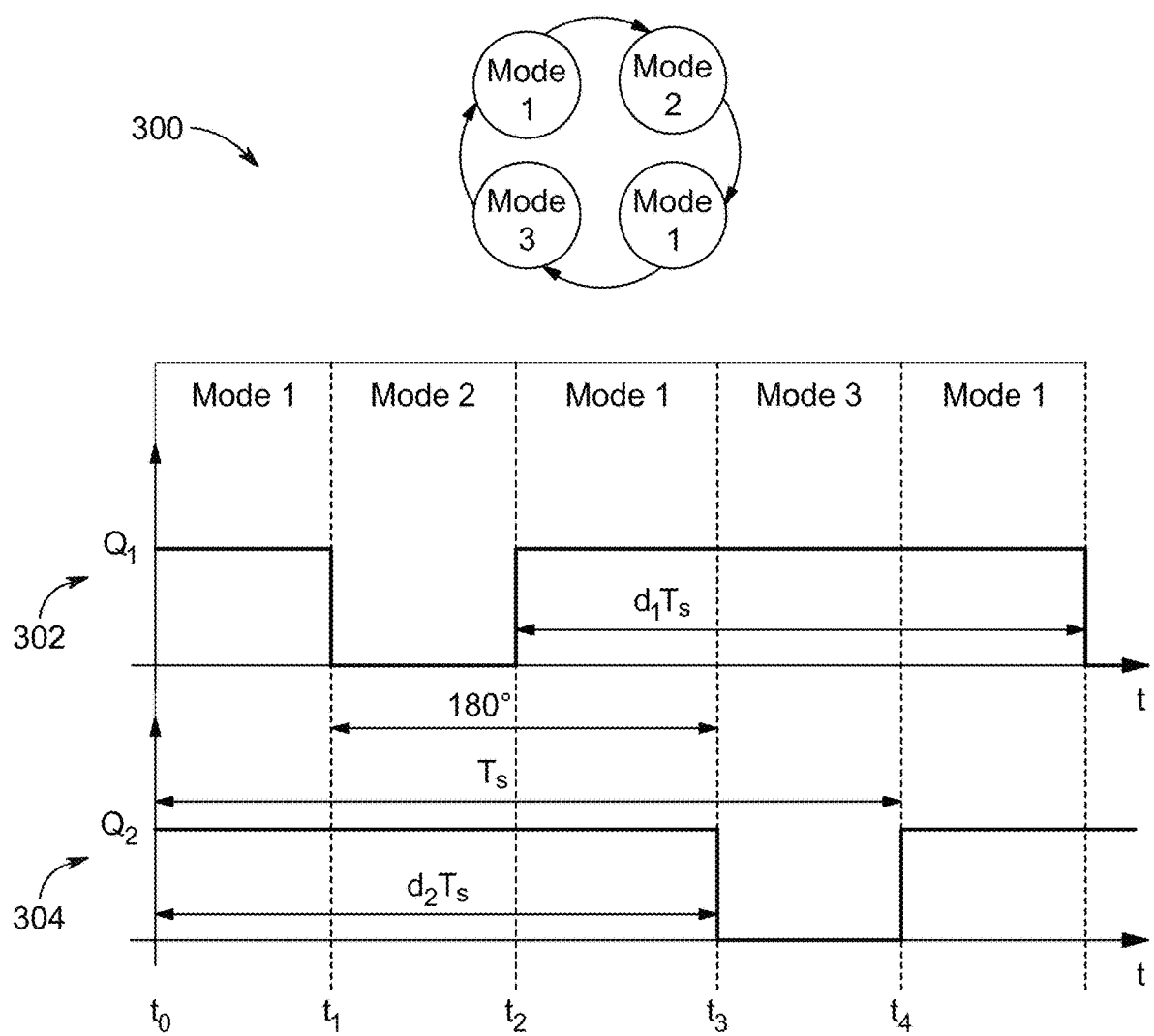
FIG. 3 illustrates a switching pattern of a switched inductor cell, according to aspects of the present disclosure.

FIG. 3 illustrates a switching pattern 300 of the switched inductor cell, according to aspects of the present disclosure. The boost converter system 200 includes two parts; an interleaved switched-inductor stage and a multiplying stage. The switched-inductor stage has two phases, which can be controlled using an interleaving technique. In an aspect, by employing the interleaving technique, the boost converter system 200 is configured to reduce an input current ripple. Each phase has a switched inductor cell that is configured to be switched by a controllable switch. The two switched-inductor phases can be controlled using two out-of-phase controllable switches (controlled switches). In an example, the controllable switches is selected from an exemplary group consisting of MOSFET, IGCT, GTO, SCR, JFET, MCT, any combinations thereof and/or the like. In an example, the controllable switches are configured to operate into three (3) modes: a first mode, a second mode, and a third mode. In an aspect, in the first mode, the first MOSFET and the second MOSFET are conducting (ON state). In the second mode, the first MOSFET is non-conducting (OFF state) and the second MOSFET is conducting. In the second mode, the first MOSFET is conducting, and the second MOSFET is non-conducting.

The operating modes of the first MOSFET and the second MOSFET (controlled switches) are configured to generate a switching pattern, which acts as driving signals for the switched inductor cell. Signal 302 indicates a switching pattern for the first MOSFET 206a. During the first mode, the first MOSFET 206a is configured to operate in the ON state and in the second mode, the first MOSFET 206a is configured to operate in the OFF state. Again during the second mode, and the third mode, the first MOSFET 206a again operates in the ON state.

Signal 304 indicates a switching pattern for the second MOSFET 206b. During the first mode and the second mode, the second MOSFET 206b is configured to operate in the OFF state. Again during the third mode, the first MOSFET 206a again operates in the ON state.

Figure 4A:
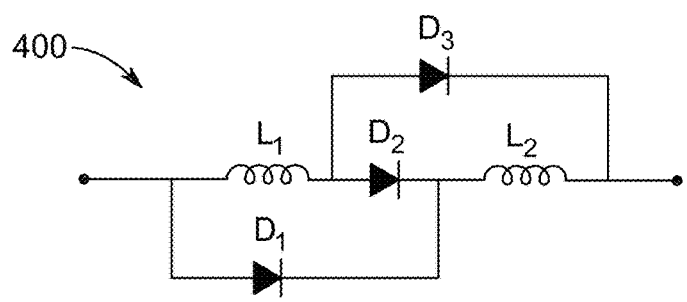
FIG. 4A illustrates a basic representation of the switched-inductor cell, according to aspects of the present disclosure.
Figure 4B:
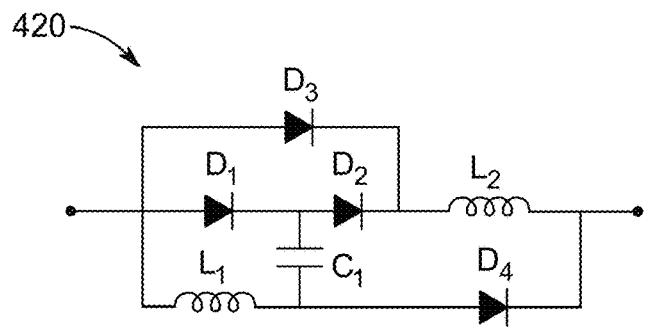
FIG. 4B illustrates a hybrid switched-inductor-capacitor, according to aspects of the present disclosure.
Figure 4C:
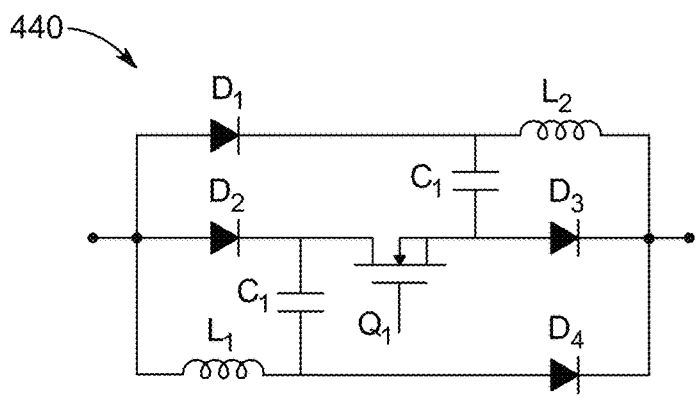
FIG. 4C illustrates another hybrid switched-inductor-capacitor, according to aspects of the present disclosure.

FIG. 4A-FIG. 4C illustrate various representations of the switched-inductor cells, according to aspects of the present disclosure. FIG. 4A illustrates a basic switched-inductor cell 400. FIG. 4B illustrates a hybrid switched-inductor-capacitor 420 having a capacitor. FIG. 4C illustrates another hybrid switched-inductor-capacitor 440 having two capacitors and a controlled switch. In an aspect, in the boost converter system 200 is configured to employ several switched-inductor cells, as shown in FIG. 4A-FIG. 4C. The different types of switched-inductor cells are used for generating different phases. In an example, the switched-inductor cells are extendable based upon the requirement such that the voltage gain can be increased, and inductor currents can be reduced.

Figure 5A:
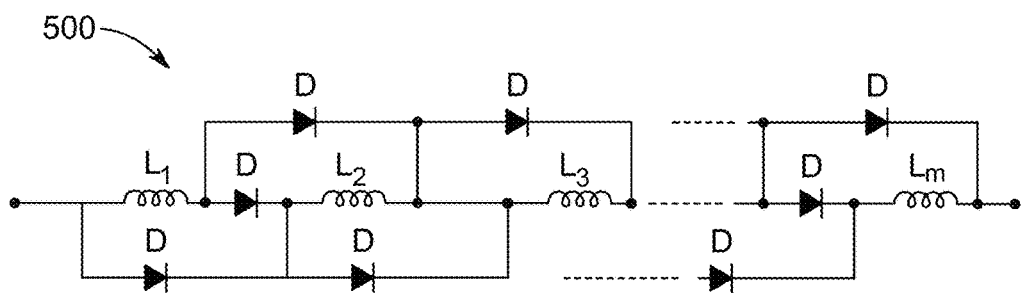
FIG. 5A illustrates an extendable switched-inductor cell with m levels, according to aspects of the present disclosure.
Figure 5B:
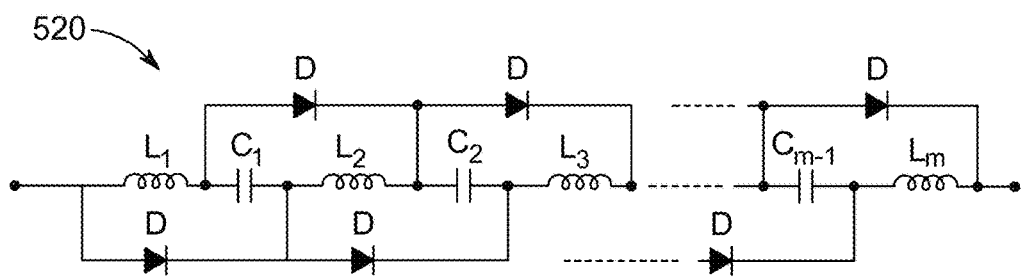
FIG. 5B illustrates another extendable switched-inductor cell with m levels, according to aspects of the present disclosure.

FIG. 5A illustrates an extendable switched-inductor cell 500 (also known as an extended self-lift cell) with m levels, according to aspects of the present disclosure. FIG. 5B illustrates another extendable switched-inductor cell 520 with m levels, according to aspects of the present disclosure.

As shown in FIG. 5A-FIG. 5B, the extendable switched-inductor cell is configured to provide two phases of energy transfer to the voltage multiplier stage, further improving the voltage gain and minimizing the potential stresses on components. The extendable switched-inductor cell can be configured in a ladder, Dickson, Cockcroft-Walton multiplier, Fibonacci, Series-Parallel, Doubler, or another type of switched-inductor cells circuits. In an aspect, the voltage multiplier cell may have multiple levels. In some examples, the voltage multiplier cell is selected from an exemplary group consisting of a Dickson, a Cockcroft-Walton (CW), and a diode-capacitor VMC.

Figure 6:
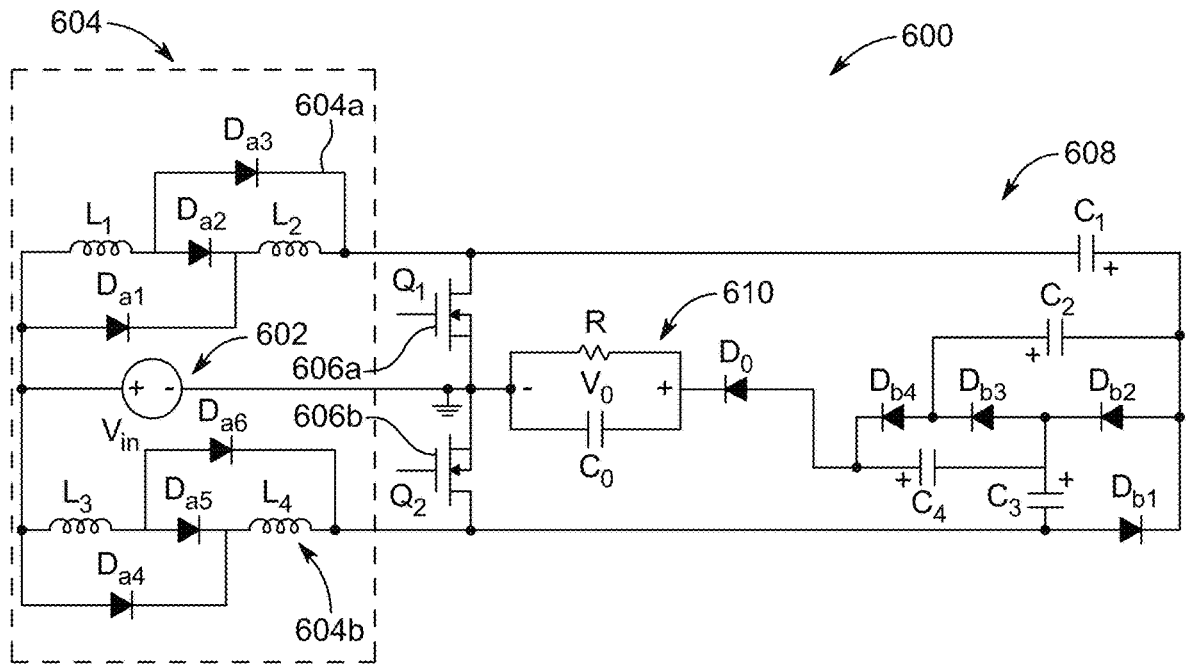
FIG. 6 depicts an electrical connection of a DC/DC power converter for providing a voltage gain, according to aspects of the present disclosure.

FIG. 6 representation of an electrical connection of a DC/DC power converter 600 providing a voltage gain, according to aspects of the present disclosure. Referring to FIG. 6, the DC/DC power converter 600 includes an input voltage source 602, a self-lift cell 604, a first switching component 606a, a second switching component 606b, a plurality of VMC 608, and a grounded output 610. In an aspect, the plurality of VMC 608 is a four (4) levels of Cockcroft-Walton (CW) voltage multiplier cells (VMCs).

In the first mode, the self-lift cell 604 is configured to perform a first storing sequence according to a first out-of-phase driving signal and a second out-of-phase driving signal. The self-lift cell includes a first loop 604a and a second loop 604b. The first storing sequence is configured to store power in the first loop 604a and the second loop 604b. The self-lift cell 604 includes a plurality of inductors and a plurality of diodes.

In the second mode, the self-lift cell 604 is configured to perform a second storing sequence and a first discharging sequence according to the first out-of-phase driving signal and the second out-of-phase driving signal. The second storing sequence is configured to store power in the second loop 604b.

The plurality of VMC 608 includes a plurality of capacitors and a plurality of diodes. The plurality of VMC 608 is electronically connected with the self-lift cell 604. The plurality of VMC 608 receives power from the first discharging sequence of the self-lift cell. The plurality of VMC 608 is electronically wired to the grounded output 610. The plurality of VMC 608 is configured to perform a second discharging sequence.

In an aspect, the plurality of VMC 608 includes a first capacitor, a second capacitor, and a third capacitor. The first capacitor and the second capacitor are configured to discharge in the second mode. The third capacitor is configured to charge in the second mode. The first capacitor and the second capacitor are configured to charge in the third mode. The third capacitor are configured to discharge in the third mode.

The grounded output 610 receives power from the second discharging sequence of the plurality of VMC 608. The grounded output 610 is configured to perform a charging sequence. The grounded output 610 is configured to store the power of the plurality of VMC 608 in the charging sequence. The grounded output 610 includes an output capacitor and an output resistor. In an aspect, the output capacitor is configured to be charged in the second mode.

In the third mode, the self-lift cell 604 is configured to perform a third storing sequence and a third discharging sequence according to the first out-of-phase driving signal and the second out-of-phase driving signal. The plurality of VMC 608 receives power from the third discharging sequence of the self-lift cell 604. The third storing sequence is configured to store power in the first loop 604a.

In an aspect, a current path is determined by a cycle of the first mode, the second mode, and the third mode. The cycle includes the first mode, the second mode, the first mode, and the third mode. The third mode returns to the first mode and the cycle repeats. The current path passes through the cycle.

In the first mode, the first out-of-phase-driving signal and the second out-of-phase driving signal are in the active state.

In the second mode, the first out-of-phase-driving signal is in the inactive state and the second out-of-phase driving signal is in the active state.

In the third mode, the first out-of-phase-driving signal is in the active state and the second out-of-phase driving signal is in the inactive state.

The first switching component 606a is set by the first out-of-phase driving signal and the second switching component is set by the second out-of-phase driving signal. When, the first out-of-phase driving signal and the second out-of-phase are in an active state, the first switching component 606a and the second switching component 606b are conducting. When, the first out-of-phase driving signal and the second out-of-phase are in an inactive state, the first switching component 606a and the second switching component 606b are not conducting. In an aspect, the first switching component 606a and the second switching component 606b include MOSFETs.

In an aspect, the DC/DC power converter 600 as shown in FIG. 6, has odd number of diodes. The plurality of VMC 608 employed in the DC/DC power converter 600 are configured to provide low potential stress across capacitors and shared ground between the input and the output.

Figure 7:
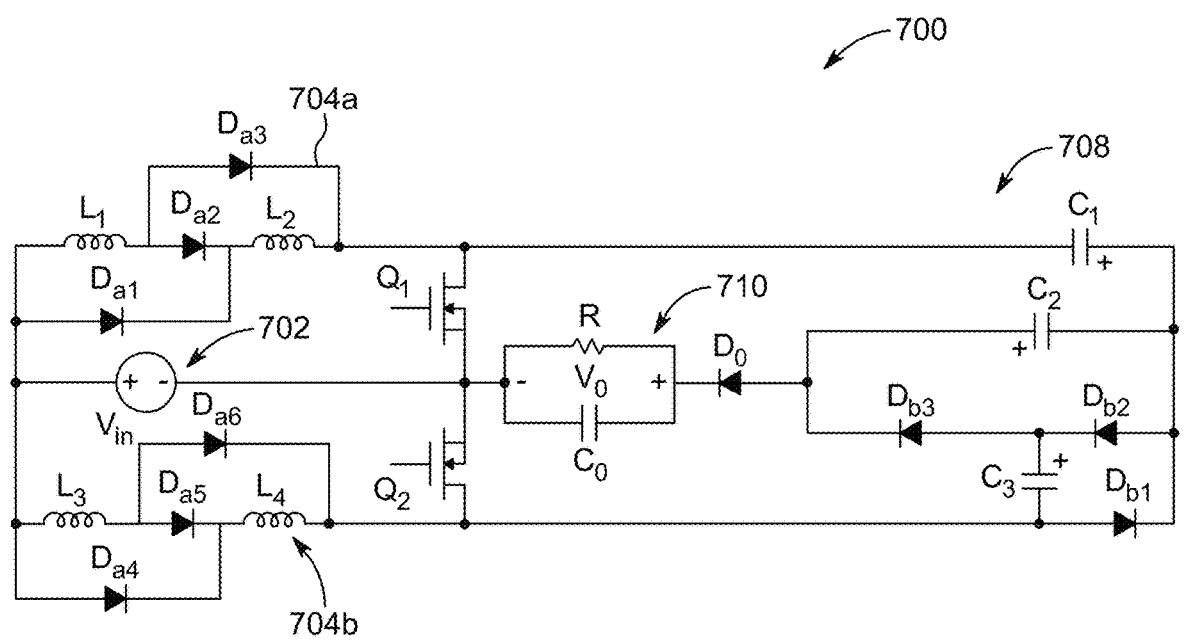
FIG. 7 depicts an electrical connection of the DC/DC power converter having a self-lift cell and 3 levels of Cockcroft-Walton (CW) voltage multiplier cells (VMCs), according to aspects of the present disclosure.

FIG. 7 depicts an electrical connection of the DC/DC power converter 700 having the self-lift cell and three (3) levels of CW VMCs, according to aspects of the present disclosure. The DC/DC power converter 700, as shown in FIG. 7 includes two basic switched-inductor cells as shown in FIG. 4A and three levels (N=3) CW VMC. Referring to FIG. 7, the DC/DC power converter 700 includes an input voltage source 702, a self-lift cell 704, a first switching component 706a, a second switching component 706b, a plurality of VMC 708, and a grounded output 710. In an aspect, the plurality of VMC 708 is a three (3) levels of Cockcroft-Walton (CW) voltage multiplier cells (VMCs). The self-lift cell 704 includes a first loop 704a and a second loop 704b. The first storing sequence is configured to store power in the first loop 704a and the second loop 704b. The self-lift cell 704 includes a plurality of inductors and a plurality of diodes.

In some aspects, the boost converter system 200 (DC/DC power converter 800) is analyzed with some assumptions for the sake of simplicity:
1. all components are ideal;
2. the duty cycles are similar, and both are higher than 0.5;
3. all caps are large, and their voltage ripples are neglected;
4. the circuit operates in the CCM mode;
5. the topology operates in the steady-state region; and
6. The MOSFETs are controlled by two out-of-phase driving signals, yielding three operational modes, as demonstrated in FIG. 8A-FIG. 8C.

Figure 8A:
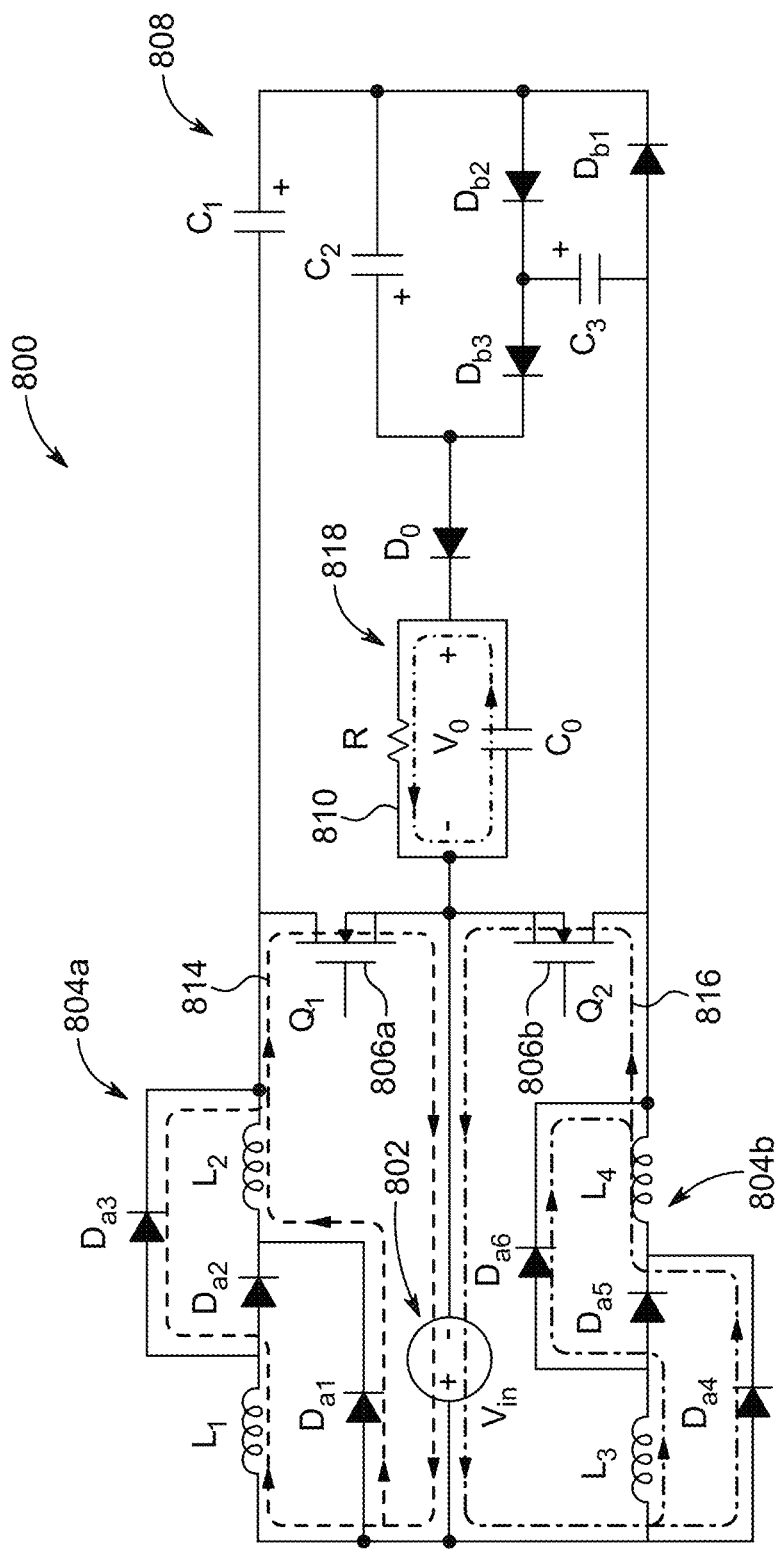
FIG. 8A depicts an equivalent circuit of the DC/DC power converter, when a first switching component and a second switching component are conducting, according to aspects of the present disclosure.

FIG. 8A depicts an equivalent circuit of the DC/DC power converter 800, when all MOSFETs are conducting, according to aspects of the present disclosure. As shown in FIG. 8A, all MOSFETs are conducting (known as the first mode).

Referring to FIG. 8A, the DC/DC power converter 800 includes a self-lift cell 804, a first switching component 806a, a second switching component 806b, a plurality of VMC 808, and a grounded output 810. The self-lift cell 804 includes a first loop 804a and a second loop 804b.

The self-lift cell 804 is configured to perform the first storing sequence in the first mode according to the first out-of-phase driving signal and the second out-of-phase driving signal.

The first storing sequence is configured to store power in the first loop and the second loop, as referred to by 814 and 816. The grounded output is configured to perform the charging sequence, as referred to by 818.

During the first mode, the diodes $D_{a1}$, $D_{a3}$, $D_{a4}$, $D_{a6}$ are forward biased and they are ON. The inductors are all in parallel to the input voltage and they are charging equally. All other diodes are not conducting, therefore separating the output from the input. The output resistor is powered by the output capacitor. The voltage of the inductors are given by:

$$L_1 \frac{di_{L_1}}{dt} = L_2 \frac{di_{L_2}}{dt} = L_3 \frac{di_{L_3}}{dt} = L_4 \frac{di_{L_4}}{dt} = V_{in}. \tag{1}$$

Figure 8B:
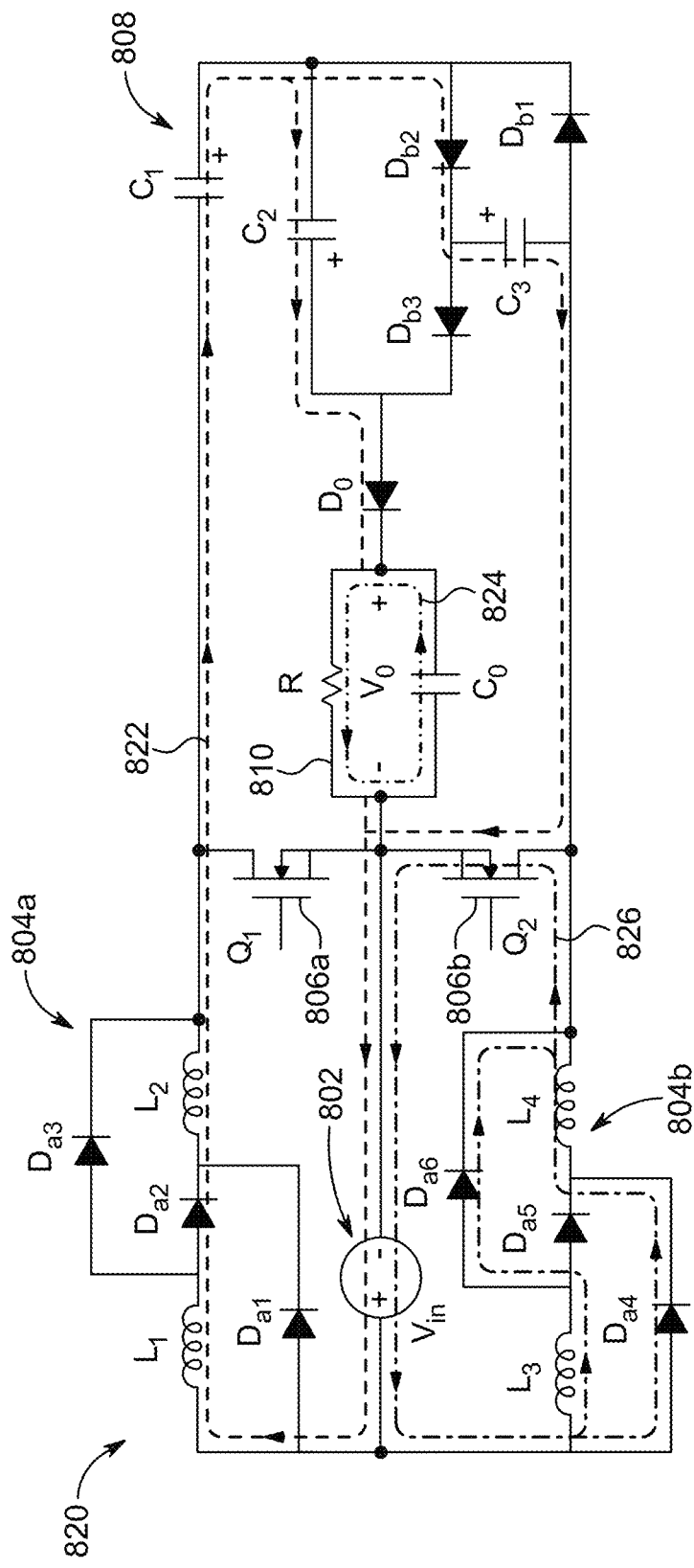
FIG. 8B depicts an equivalent circuit of the DC/DC power converter, when the first switching component is non-conducting and the second switching component is conducting, according to aspects of the present disclosure.

FIG. 8B depicts an equivalent circuit of the DC/DC power converter 820, when the first switching component 806a is non-conducting and the second switching component 806b is conducting, according to aspects of the present disclosure. As shown in FIG. 8B, the first switching component 806a is non-conducting and the second switching component 806b is conducting (known as the second mode).

The self-lift cell 804 is configured to perform a second storing sequence and a first discharging sequence in the second mode according to the first out-of-phase driving signal and the second out-of-phase driving signal.

The second storing sequence is configured to store power in the second loop, referred to by 826. The plurality of VMC is configured to perform the second discharging sequence, as referred to by 822. The grounded output receives power from the second discharging sequence of the plurality of VMC. The grounded output is configured to perform the charging sequence, as referred by 824. The grounded output is configured to store the power of the plurality of VMC in the charging sequence.

During the second mode, the inductors $L_3$ and $L_4$ are still charging from $V_{in}$ source 802. The other inductors $L_1$ and $L_2$ are now discharging their accumulated energy to the VMC capacitors. The diodes $D_{b2}$ and $D_o$ are forward biased while the other diodes $D_{b1}$ and $D_{b3}$ are reversed biased and they are OFF. The capacitor $C_3$ and the output capacitor are charging, and the other capacitors are discharging. The voltage of the inductors are given by:

$$L_1 \frac{di_{L_1}}{dt} + L_2 \frac{di_{L_2}}{dt} = V_{in} + V_{C_1} - V_{C_3} \qquad (2)$$
$$= V_{in} + V_{C_1} + V_{C_2} - V_o;$$

$$L_3 \frac{di_{L_3}}{dt} = L_4 \frac{di_{L_4}}{dt} \qquad (3)$$
$$= V_{in}.$$

Figure 8C:
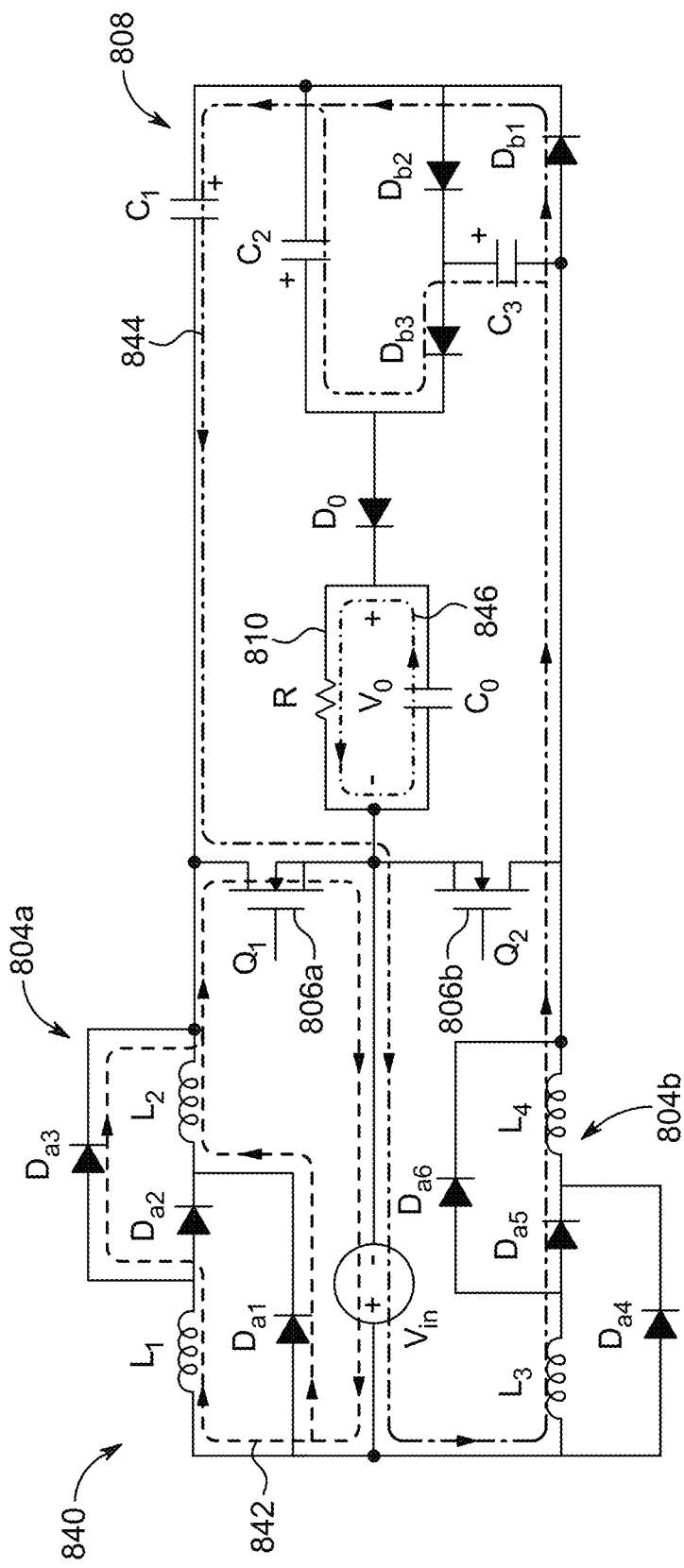
FIG. 8C depicts an equivalent circuit of the DC/DC power converter, when the first switching component is conducting and the second switching component is non-conducting, according to aspects of the present disclosure.

FIG. 8C depicts an equivalent circuit of the boost converter system 840, when the first switching component 806a is conducting and the second switching component 806b is non-conducting, according to aspects of the present disclosure.

As shown in FIG. 8C, the first switching component 806a is conducting and the second switching component 806b is non-conducting (known as the third mode).

The self-lift cell 804 is configured to perform the third storing sequence and the third discharging sequence in the third mode according to the first out-of-phase driving signal and the second out-of-phase driving signal.

The plurality of VMC 808 is configured to receive power from the third discharging sequence of the self-lift cell, as referred by 844. The third storing sequence is configured to store power in the first loop, as referred by 842. The grounded output is configured to perform the charging sequence, as referred by 846. The grounded output is configured to store the power of the plurality of VMC in the charging sequence.

During the third mode, the inductors $L_1$ and $L_2$ are connected in parallel to the input source 802 and being charged. The inductors $L_3$ and $L_4$ are linked in series and discharge their stored energy to the VMC stage. The diodes $D_{b2}$ and $D_o$ are reversed biased and they are not conducting, and $D_{b1}$ and $D_{b3}$ are forward biased and they are conducting. The voltage across inductors (coils) are calculated by:

$$L_1 \frac{di_{L_1}}{dt} = L_2 \frac{di_{L_2}}{dt} = V_{in}. \qquad (4)$$

$$L_3 \frac{di_{L_3}}{dt} + L_4 \frac{di_{L_4}}{dt} = V_{in} - V_{C_1} \qquad (5)$$
$$= V_{in} + V_{C_3} - V_{C_2} - V_{C_1}.$$

In the present boost converter system 200, following calculations are performed to measure the voltage gain:
Ideal Voltage Gain Calculations:

The state equations of the inductor voltages are derived using the voltage-second balance of the inductors, gives as:

$$\int_0^{dt}\left(L_2 \frac{di_{L_2}}{dt} + L_1 \frac{di_{L_1}}{dt}\right)dt + \int_{dt}^{T}\left(L_2 \frac{di_{L_2}}{dt} + L_1 \frac{di_{L_1}}{dt}\right)dt = \qquad (6)$$
$$2dV_{in} + (1-d)(V_{in} + V_{C_1} - V_{C_3});$$

$$\int_0^{dt}\left(L_3 \frac{di_{L_3}}{dt} + L_4 \frac{di_{L_4}}{dt}\right)dt + \int_{dt}^{T}\left(L_3 \frac{di_{L_3}}{dt} + L_4 \frac{di_{L_4}}{dt}\right)dt = \qquad (7)$$
$$2dV_{in} + (1-d)(V_{in} - V_{C_1});$$

The voltage across $C_1$, $C_2$, and $C_3$ is given by:

$$V_{C_1} = \frac{(1+d)V_{in}}{1-d}; \text{ and} \qquad (8)$$

$$V_{C_2} = V_{C_3} = 2\frac{(1+d)V_{in}}{1-d}. \qquad (9)$$

The voltage gain of the boost converter system 200 presented in FIG. 8 is calculated using:

$$\frac{V_o}{V_{in}} = \frac{4(1+d)}{1-d}. \qquad (10)$$

For the boost converter system with N number of VMC and m number of switched inductors cells, the voltage gain is calculated by $$\frac{V_o}{V_{in}} = \frac{(N+1)(1+md)}{1-d}. \qquad (11)$$

Figure 9A:
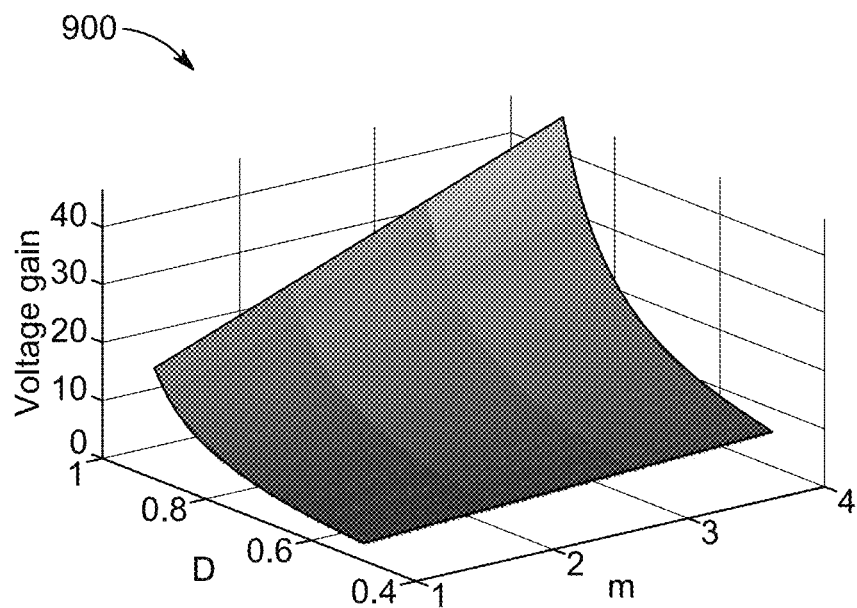
FIG. 9A represents a voltage gain of the boost converter system under variation of the duty cycle and the number of switched inductor cells, according to aspects of the present disclosure.
Figure 9B:
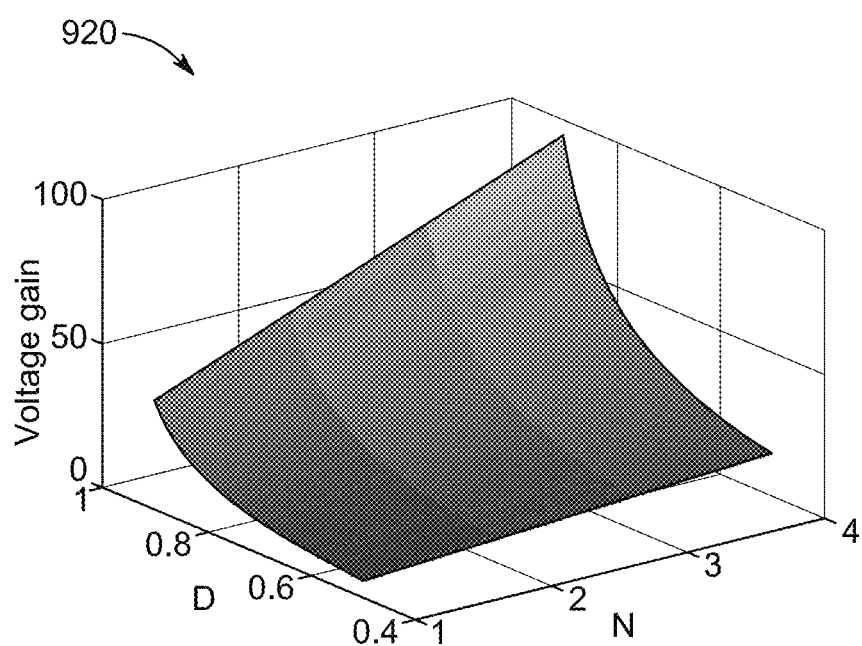
FIG. 9B represents a voltage gain of the boost converter system under variation of the duty cycle and the number of VMCs, according to aspects of the present disclosure.
Figure 9C:
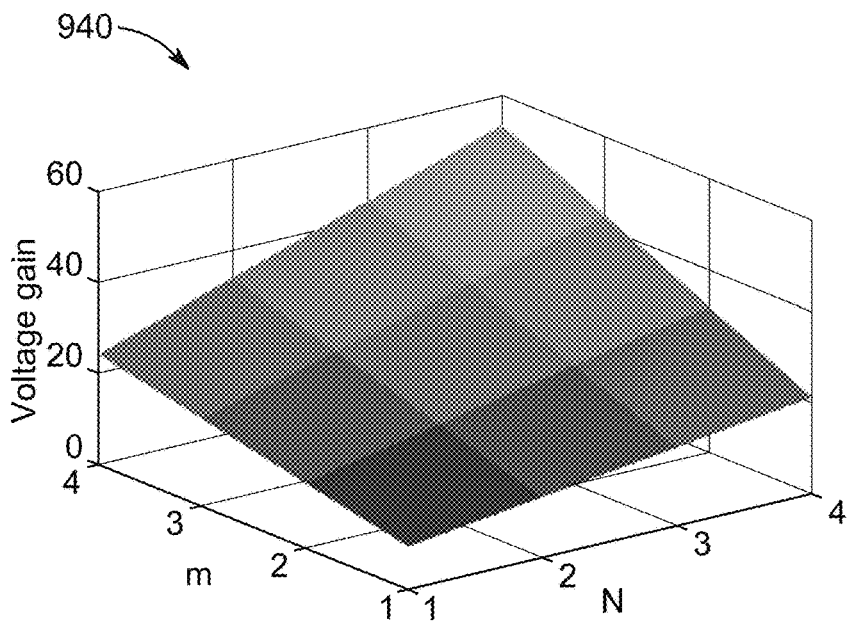
FIG. 9C represents a voltage gain of the boost converter system under variation of the number of the VMCs and the number of the switched inductor cells, according to aspects of the present disclosure.

FIG. 9A-FIG. 9C show the voltage gain of the boost converter system 200 under variation of duty ratio vs. the number of switched-inductor cells and voltage multiplier stages.

FIG. 9A represents a voltage gain 900 of the boost converter system 200 under variation of the duty cycle and the number of switched inductor cells, according to aspects of the present disclosure.

FIG. 9B represents a voltage gain 920 of the boost converter system 200 under variation of the duty cycle and the number of VMCs, according to aspects of the present disclosure.

FIG. 9C represents a voltage gain 940 of the boost converter system 200 under variation of the number of the VMCs and the number of the switched inductor cells, according to aspects of the present disclosure.

The voltage gain, as shown in equation (10) was driven under the assumption of equal duty cycles for the controlled switches and a single input source. In some aspects, the duty cycles can be different, and dual independent input sources can feed the boost converter system. The summary of the output voltage gain at different duty cycles and dual input sources is summarized in Tables 1 and 2.

TABLE 1

Output voltage at various configurations (having even VMCs)

| Configuration | $V_o$ (output voltage) |
|---|---|
| $d_1 \neq d_2$ and $V_{in_1} \neq V_{in_2}$ | $\frac{N+2}{2}\frac{1+d_1}{1-d_1}V_{in_1} + \frac{N}{2}\frac{1+d_2}{1-d_2}V_{in_2}$ |

TABLE 1-continued

Output voltage at various configurations (having even VMCs)

| Configuration | $V_o$ (output voltage) |
|---|---|
| $d_1 \neq d_2$ and $V_{in_1} = V_{in_2}$ | $V_{in}\left(\dfrac{N+2}{2}\dfrac{1+d_1}{1-d_1} + \dfrac{N}{2}\dfrac{1+d_2}{1-d_2}\right)$ |
| $d_1 = d_2$ and $V_{in_1} \neq V_{in_2}$ | $\dfrac{(1+d)}{1-d}\left(V_{in_1}\dfrac{N+2}{2} + V_{in_2}\dfrac{N}{2}\right)$ |
| $d_1 = d_2$ and $V_{in_1} = V_{in_2}$ | $\dfrac{(N+1)(1+d)}{1-d}V_{in}$ |

TABLE 2

Output voltage at various configurations (having odd VMCs).

| Configuration | $V_o$ (output voltage) |
|---|---|
| $d_1 \neq d_2$ and $V_{in_1} \neq V_{in_2}$ | $\dfrac{N+1}{2}\left(\dfrac{1+d_1}{1-d_1}V_{in_1} + \dfrac{1+d_2}{1-d_2}V_{in_2}\right)$ |
| $d_1 \neq d_2$ and $V_{in_1} = V_{in_2}$ | $V_{in}\dfrac{N+1}{2}\left(\dfrac{1+d_1}{1-d_1} + \dfrac{1+d_2}{1-d_2}\right)$ |
| $d_1 = d_2$ and $V_{in_1} \neq V_{in_2}$ | $\dfrac{(1+d)}{1-d}\dfrac{N+1}{2}\left(V_{in_1} + V_{in_2}\right)$ |
| $d_1 = d_2$ and $V_{in_1} = V_{in_2}$ | $\dfrac{(N+1)(1+d)}{1-d}V_{in}$ |

Figure 10:
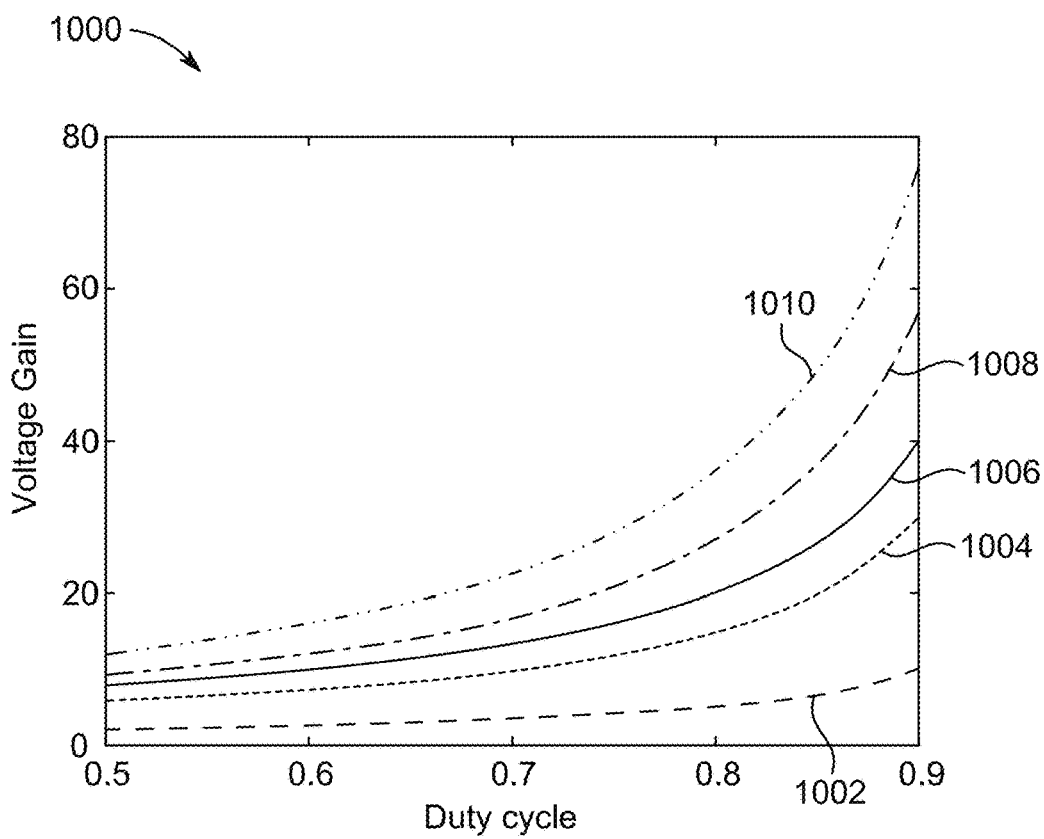
FIG. 10 represents a voltage gain of the boost converter system as compared to other conventional converters, according to aspects of the present disclosure.

FIG. 10 represents a voltage gain 1000 of the boost converter system 200 as compared to other conventional converter, according to aspects of the present disclosure. Signal 1002 represents a voltage gain of an interleaved boost converter. Signal 1004 represents a voltage gain of an interleaved converter with bifold Dickson VMC converter (IBCBD) converter with N=2. Signal 1006 represents a voltage gain of the interleaved converter with bifold Dickson VMC converter (IBCBD) converter with N=3. Signal 1008 represents a voltage gain of the boost converter system with N=2. Signal 1010 represents a voltage gain of the boost converter system with N=3.

As shown in FIG. 10, the voltage gain of the boost converter system 200 is compared with the conventional converter, such as interleaved conventional boost converter and interleaved converter with a bifold Dickson VMC converter (IBCBD). The boost converter system is also compared to other topologies in terms of number of components and voltage stresses. Table 3 summarizes the features of the boost converter system in comparison with other topologies.

TABLE 3

Comparison of the boost converter system 200 against conventional converters

| Topology | High step-up dc-dc converter | High step-up ZVT converter with built-in transformer voltage doubler cell | High step-up converter with a multi-coupled inductor and voltage multiplier | The boost converter system 200 |
|---|---|---|---|---|
| Static Gain | $\dfrac{d^2-3d+3}{(1-d)^2}$ | $\dfrac{2N+2}{1-D}$ | $\dfrac{2N+2}{1-D}$ | $\dfrac{4d+4}{1-d}$ |
| $V_{max}$ on MOSFETs | $\dfrac{2-d}{d^2-3d+3}$ | $\dfrac{1}{2N+2}$ | $\dfrac{1}{2N+2}$ | $\dfrac{1+d}{1-d}$ |
| $V_{max}$ on Diodes | $\dfrac{1}{d^2-3d+3}$ | 1 | $\dfrac{2N+1}{2N+2}$ | $\dfrac{d}{1-d}$ |
| No. of inductors | 2 | 6 | 2 | 4 |
| No. of Capacitors | 3 | 5 | 5 | 3 |
| No. of MOSFETS | 2 | 4 | 4 | 2 |
| No. of diodes | 3 | 4 | 6 | 8 |

EXAMPLES AND EXPERIMENTS

The following examples are provided to illustrate further and to facilitate the understanding of the present disclosure.
Experimental Data and Analysis
First Experiment: Selection of the Controlled Switches During the first experiment, various controlled switches were used in the boost converter system 200 and corresponding voltage outputs were calculated. Following equations were used to design the boost converter system 200.

The controlled switches in the boost converter system 200 are MOSFETs. The maximum potential stress across the controlled switches is calculated by $$V_{Q_1} = V_{Q_2} = V_{in}\frac{1+d}{1-d}; \quad (12)$$

The peak current running through the controlled switch was determined from the inductor currents. Each MOSFET processed the current from both phases. Therefore, to ensure the operation of the controlled switch, the current rating has to be twice the peak value of inductor currents.
Second Experiment: Selection of the Diodes During the second experiment, various diodes were used in the boost converter system 200 and corresponding potential stress on the diodes were calculated. Following equations were used to calculate the potential stress on the diodes:

$$V_{D_{a2}} = V_{D_{a5}} = V_{in}; \quad (13)$$

$$V_{D_{a1}} = V_{D_{a3}} = V_{D_{a4}} = V_{D_{a6}} = V_{in}\frac{d}{1-d}; \quad (14)$$

$$V_{D_{b1}} = V_{D_{b2}} = 2V_{in}\frac{1+d}{1-d} = V_o\frac{2}{N+1}; \quad (15)$$

$$V_{D_o} = V_{in}\frac{1+d}{1-d} = V_o\frac{1}{N+1}; \quad (16)$$

The average and quadratic mean values of the diode currents and inductors currents are listed in Table 4 and Table 5, respectively.

TABLE 4 illustrates average values of diode currents

| Diode | N is odd | N is even |
|---|---|---|
| $I_{D_o}, I_{D_{b1}}, I_{D_{b2}}$ | $\dfrac{V_o}{R}$ | $\dfrac{V_o}{R}$ |
| $I_{D_{a1}}, I_{D_{a3}}$ | $\dfrac{V_o}{R}\dfrac{0.5d(N+1)}{(1-d)}$ | $\dfrac{V_o}{R}\dfrac{0.5d(N+2)}{(1-d)}$ |
| $I_{D_{a4}}, I_{D_{a6}}$ | $\dfrac{V_o}{R}\dfrac{0.5d(N+1)}{(1-d)}$ | $\dfrac{V_o}{R}\dfrac{0.5d(N)}{(1-d)}$ |
| $I_{D_{a2}}$ | $\dfrac{V_o}{R}\dfrac{N+1}{2}$ | $\dfrac{V_o}{R}\dfrac{N+2}{2}$ |
| $I_{D_{a5}}$ | $\dfrac{V_o}{R}\dfrac{N+2}{2}$ | $V_o\dfrac{\frac{N}{2}}{R}$ |

TABLE 5

Root Mean Square (RMS) values of diode currents

| Diode | N is odd | N is even |
|---|---|---|
| $I_{D_o}, I_{D_{b1}}, I_{D_{b2}}$ | $\dfrac{V_o}{R}\sqrt{\dfrac{1}{1-d}}$ | $\dfrac{V_o}{R}\sqrt{\dfrac{1}{1-d}}$ |
| $I_{D_{a1}}, I_{D_{a3}}$ | $\dfrac{V_o}{R}\dfrac{N+1}{2(1-d)}\sqrt{d}$ | $\dfrac{V_o}{R}\dfrac{N+2}{2(1-d)}\sqrt{d}$ |
| $I_{D_{a4}}, I_{D_{a6}}$ | $\dfrac{V_o}{R}\dfrac{N+1}{2(1-d)}\sqrt{d}$ | $\dfrac{V_o}{R}\dfrac{N+2}{2(1-d)}\sqrt{d}$ |
| $I_{D_{a2}}$ | $\dfrac{V_o}{R}\dfrac{N+1}{2}\sqrt{\dfrac{1}{1-d}}$ | $\dfrac{V_o}{R}\dfrac{N+2}{2}\sqrt{\dfrac{1}{1-d}}$ |
| $I_{D_{a5}}$ | $\dfrac{V_o}{R}\dfrac{N+1}{2}\sqrt{\dfrac{1}{1-d}}$ | $\dfrac{V_o}{R}\dfrac{N}{2}\sqrt{\dfrac{1}{1-d}}$ |

Third Experiment: Selection of the Inductors

During the third experiment, various inductors were used in the boost converter system 200 and corresponding values were calculated. The input current equation can be formulated to be a function of the load, which is given by:

$$I_{in} = (N+1)\frac{V_o}{R}\frac{(1+d)}{1-d}. \tag{17}$$

The average currents passing through coils $L_1$ and $L_2$ is given by $$I_{L_1} = I_{L_2} = \begin{cases} \dfrac{V_o}{R}\dfrac{(N+2)}{2(1-d)} & N \text{ is even} \\ \dfrac{V_o}{R}\dfrac{N}{(1-d)} & N \text{ is odd} \end{cases}; \tag{18}$$

The average value of the currents running through coils $L_3$ and $L_4$ is given by $$I_{L_3} = I_{L_4} = \begin{cases} \dfrac{V_o}{R}\dfrac{N}{2(1-d)} & N \text{ is even} \\ \dfrac{V_o}{R}\dfrac{N}{(1-d)} & N \text{ is odd} \end{cases}; \tag{19}$$

To ensure the continuity of the inductor currents a minimum requirement of the energy storage. The smallest inductance for $L_1$ and $L_2$ that ensures the operation in the CCM mode can be calculated using:

$$L_{1,crit} = L_{2,crit} = \begin{cases} \dfrac{V_{in}d(1-d)^2}{(N+2)I_o f_s} & N \text{ is even} \\ \dfrac{V_{in}d(1-d)^2}{2NI_o f_s} & N \text{ is odd} \end{cases}. \tag{20}$$

The critical inductance for $L_3$ and $L_4$ is given as:

$$L_{3,crit} = L_{4,crit} = \begin{cases} \dfrac{V_{in}d(1-d)^2}{NI_o f_s} & N \text{ is even} \\ \dfrac{V_{in}d(1-d)^2}{2NI_o f_s} & N \text{ is odd} \end{cases}. \tag{21}$$

The peak value of inductor current is given by:

$$I_{L_1,pk} = \begin{cases} \dfrac{V_o}{R}\dfrac{N+2}{2(1-d)} + \dfrac{V_{in}d}{2L_1 f_s} & N \text{ is even} \\ \dfrac{V_o}{R}\dfrac{N}{(1-d)} + \dfrac{V_{in}d}{2L_1 f_s} & N \text{ is odd} \end{cases}; \tag{22}$$

$$I_{L_2,pk} = \begin{cases} \dfrac{V_o}{R}\dfrac{N+2}{2(1-d)} + \dfrac{V_{in}d}{2L_2 f_s} & N \text{ is even} \\ \dfrac{V_o}{R}\dfrac{N}{(1-d)} + \dfrac{V_{in}d}{2L_2 f_s} & N \text{ is odd} \end{cases}; \tag{23}$$

$$I_{L_3,pk} = \begin{cases} \dfrac{V_o}{R}\dfrac{N}{2(1-d)} + \dfrac{V_{in}d}{2L_3 f_s} & N \text{ is even} \\ \dfrac{V_o}{R}\dfrac{N}{(1-d)} + \dfrac{V_{in}d}{2L_3 f_s} & N \text{ is odd} \end{cases}; \tag{24}$$

$$I_{L_4,pk} = \begin{cases} \dfrac{V_o}{R}\dfrac{N}{2(1-d)} + \dfrac{V_{in}d}{2L_4 f_s} & N \text{ is even} \\ \dfrac{V_o}{R}\dfrac{N}{(1-d)} + \dfrac{V_{in}d}{2L_4 f_s} & N \text{ is odd} \end{cases}; \tag{25}$$

The effective value of the current going through inductors is calculated by:

$$I_{L_1,RMS} = \begin{cases} \sqrt{\left(\dfrac{V_o}{R}\dfrac{N+2}{2(1-d)}\right)^2 + \left(\dfrac{V_{in}d}{2\sqrt{3}L_1 f_s}\right)^2} & N \text{ is even} \\ \sqrt{\left(\dfrac{V_o}{R}\dfrac{N}{(1-d)}\right)^2 + \left(\dfrac{V_{in}d}{2\sqrt{3}L_1 f_s}\right)^2} & N \text{ is odd} \end{cases}; \tag{26}$$

$$I_{L_2,RMS} = \begin{cases} \sqrt{\left(\dfrac{V_o}{R}\dfrac{N+2}{2(1-d)}\right)^2 + \left(\dfrac{V_{in}d}{2\sqrt{3}L_2 f_s}\right)^2} & N \text{ is even} \\ \sqrt{\left(\dfrac{V_o}{R}\dfrac{N}{(1-d)}\right)^2 + \left(\dfrac{V_{in}d}{2\sqrt{3}L_2 f_s}\right)^2} & N \text{ is odd} \end{cases}; \tag{27}$$

-continued $$I_{L_3,RMS} = \begin{cases} \sqrt{\left(\frac{V_o}{R}\frac{N}{2(1-d)}\right)^2 + \left(\frac{V_{in}d}{2\sqrt{3}L_3 f_s}\right)^2} & N \text{ is even} \\ \sqrt{\left(\frac{V_o}{R}\frac{N}{(1-d)}\right)^2 + \left(\frac{V_{in}d}{2\sqrt{3}L_3 f_s}\right)^2} & N \text{ is odd} \end{cases} \quad (28)$$

$$I_{L_4,RMS} = \begin{cases} \sqrt{\left(\frac{V_o}{R}\frac{N}{2(1-d)}\right)^2 + \left(\frac{V_{in}d}{2\sqrt{3}L_4 f_s}\right)^2} & N \text{ is even} \\ \sqrt{\left(\frac{V_o}{R}\frac{N}{(1-d)}\right)^2 + \left(\frac{V_{in}d}{2\sqrt{3}L_4 f_s}\right)^2} & N \text{ is odd} \end{cases} \quad (29)$$

Fourth Experiment: Selection of the Capacitors

During the fourth experiment, various capacitors were used in the boost converter system 200 and corresponding voltage rating of the capacitors were calculated. The voltage rating of the capacitors can be calculated using equations 8 and 9. The capacitance value was calculated based on the tolerated voltage ripples $\Delta V_C$ as follows $$C = \frac{V_o}{R}\frac{(1-d)}{\Delta V_C}T_S; \quad (30)$$

The effective value of VMC capacitors are given by:

$$I_{C_1,RMS} = I_{C_2,RMS} = I_o\sqrt{\frac{d}{1-d}}; \quad (31)$$

$$I_{C_o,RMS} = I_o\left(1 + \sqrt{\frac{d}{1-d}}\right); \quad (32)$$

Fifth Experiment: Calculations of Component Losses

During the fifth experiment, losses in the boost converter system 200 were calculated. It was evident that the losses in the boost converter system 200 occur mainly from the diodes, controlled switches, and inductors. Other elements were insignificant, such as the parasitic elements and the conduction loss in the capacitors. The boost converter system's losses calculations can be grouped by the losses in each part, which helps to obtain an optimizes design and selection of suitable components. The conduction loss in each magnetic inductor can be calculated by:

$$P_L = I_{L,RMS}^2 \times R_{dc}, \quad (33)$$

where $R_{dc}$ is the resistance of the winding. The core loss of the inductor is also calculated for each inductor separately, which is given by $$K_{Fe}\left(\frac{dV_{in}}{2f_s N_1 A_c}\right)^\beta (A_c \times l_m), \quad (34)$$

where $l_m$ is the magnetic length path, $N_1$ is the number of turns on the primary side, and $A_c$ is the area of the magnetic core. The constants $K_{Fe}$ and $\beta$ are fitting parameters of the core loss curve and can be obtained from the manufacturer's datasheet. The loss in each MOSFET is calculated by:

$$P_{Q,total} = I_{Q,RMS}^2 R_{on} + 0.5 V_Q(t_{off} + t_{on})f_s + 0.5 C_{oss} V_Q^2 f_s. \quad (35)$$

where the first term in the equation represents the conduction loss, which depends on ON-state resistance $R_d$s(on). The other terms of the equation represents the switching losses, where $t_{on}$ and $t_{off}$ denote the conduction and blocking time of the MOSFETs, accordingly, and $C_{oss}$ is MOSFET's output capacitance. The conduction loss of a diode is provided by:

$$P_D = V_F \times I_{D,avg} + Q_R \times V_r \times f_s. \quad (36)$$

The first term of the equation is the forward conduction loss, where $V_F$ denotes the diode's forward voltage. The second term represents the reverse recovery loss, where $Q_R$ the total charge of the reverse recovery region, and $V_r$ the peak reverse potential. In comparison to the above damages, the losses incurred by the capacitors' internal resistance ($R_C$) are insignificant. The damages incurred as a result of $R_C$ are derived by $$P_C = I_{C,rms}^2 R_C \quad (37)$$

The total power loss is the sum of all losses. The theoretical efficiency is used to verify the experimental operation. However, practical efficiency is typically lower than the theoretical efficiency because of the wiring and parasitic effects.

Sixth Experiment: Simulation Results of the Boost Converter System 200

The operation of the boost converter system 200 was verified by simulation results, in which the boost converter system was able to convert the 20 V input voltage to 400 V output load. The complete list of the parameters is presented in Table 6.

TABLE 6

| Simulation parameters | |
|---|---|
| Parameter | Value |
| $V_{in}$ | 20 V |
| $V_o$ | 400 V |
| Output load | 800Ω |
| d | 0.66 |
| frequency | 100 kHz |
| coils | 100 μH |
| Capacitors | 10 μF |

Figure 11A:
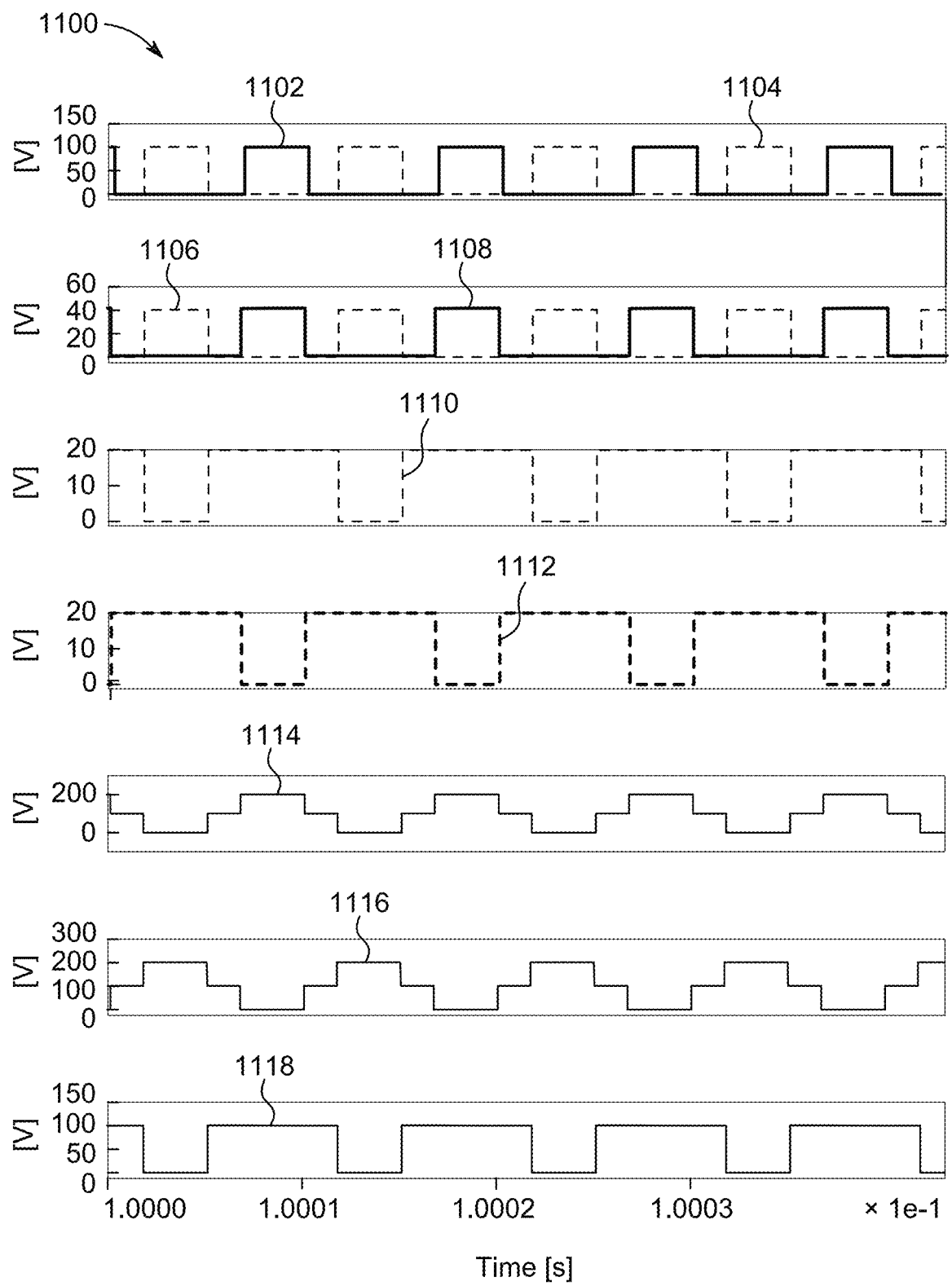
FIG. 11A depicts simulation results of the boost converter system at potential stress across the switched inductor cells and diodes, according to aspects of the present disclosure.

Further, several small values of the parasitic elements were added to the capacitors and inductors to avoid singular loops and help the solver runs correctly. FIG. 11A depicts simulation results 1100 of the boost converter system 200 at potential stress across the controlled switches and diodes. Signal 1102 represents voltage applied across the first MOSFET ($Q_1$ Voltage). Signal 1104 represents voltage applied across the second MOSFET ($Q_2$ Voltage). Signal 1106 represents voltage applied across the diodes $D_{a1}$, $D_{a3}$ ($D_{a1}$, $D_{a3}$ Voltage). Signal 1108 represents voltage applied across the diodes $D_{a4}$, $D_{a6}$ ($D_{a4}$, $D_{a6}$ Voltage). Signal 1110 represents voltage applied across the diode $D_{a2}$. Signal 1112 represents voltage applied across the diode Das. Signal 1114 represents voltage applied across the diode $D_{b1}$. Signal 1116 represents voltage applied across the diodes $D_{b2}$, $D_{b3}$. Signal 1118 represents voltage applied across the diode $D_o$.

The potential stress on controlled switches was 100 V, and the highest diode blocking voltage in the switched-inductor cells did not exceed 40 V. The potential stress on the VMC diodes was 200V for all diodes, except the output diode, which has a maximum of 100 V.

Figure 11B:
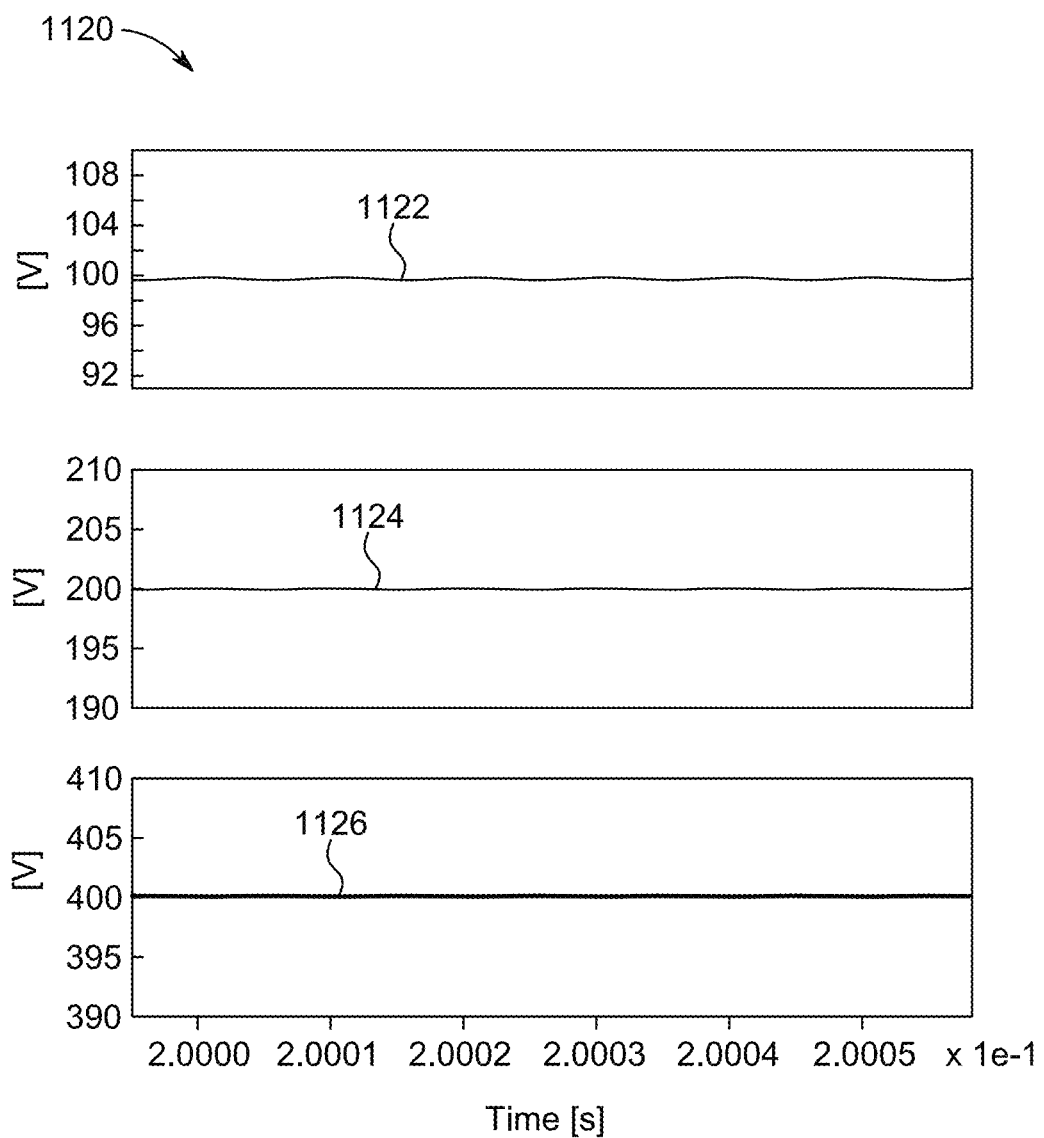
FIG. 11B depicts output results of the boost converter system for the output voltage and capacitors voltage, according to aspects of the present disclosure.

FIG. 11B depicts output results 1120 of the boost converter system 200 corresponding to the output voltage and capacitor voltage, according to aspects of the present disclosure. Signal 1122 represents voltage applied across capacitor $C_1$ ($V_{C1}$). Signal 1124 represents voltage applied across the capacitors $C_2$ and $C_3$ ($V_{C2}$ and $V_{C3}$). Signal 1126 represents voltage applied across capacitor $C_o$ ($V_{Co}$). The voltage across capacitors $C_1$, $C_2$, and $C_3$ is 100 V, 200 V and 200 V, respectively. The voltage across the load has less 1% voltage ripples, as shown by signal 1126.

Figure 12A:
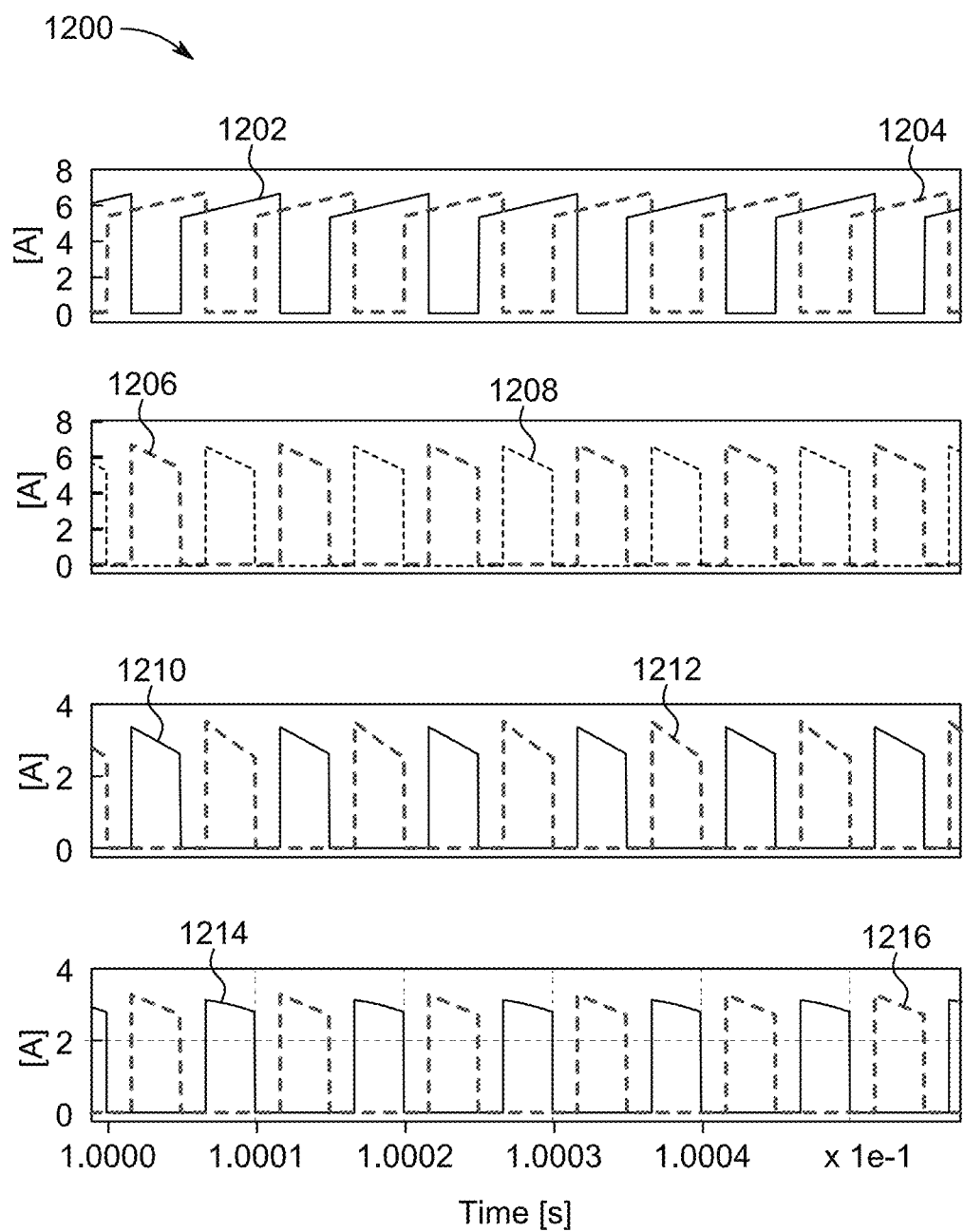
FIG. 12A depicts simulation results of the boost converter system at current stress in the semiconductor switching elements, according to aspects of the present disclosure.

FIG. 12A depicts simulation results 1200 of the boost converter system 200 at current stress in the semiconductor switching elements, according to aspects of the present disclosure. Signal 1202 represents current applied across the diodes $D_1$, $D_3$ ($I_{D1}$ & $I_{D3}$). Signal 1204 represents current applied across the diodes $D_{a4}$, $D_{a6}$ ($I_{D4}$ & $I_{D6}$). Signal 1206 represents current applied across diode $D_{a2}$ ($I_{D2}$). Signal 1208 represents current applied across diode Das ($I_{D5}$). Signal 1210 represents current applied across the diode $D_{b1}$ ($I_{Db1}$). Signal 1212 represents current applied across the diode $D_{b2}$ ($I_{Db2}$). Signal 1214 represents current applied across the diode $D_{b3}$ ($I_{Db3}$). Signal 1216 represents current applied across the diode $D_o$($I_{Do}$).

Figure 12B:
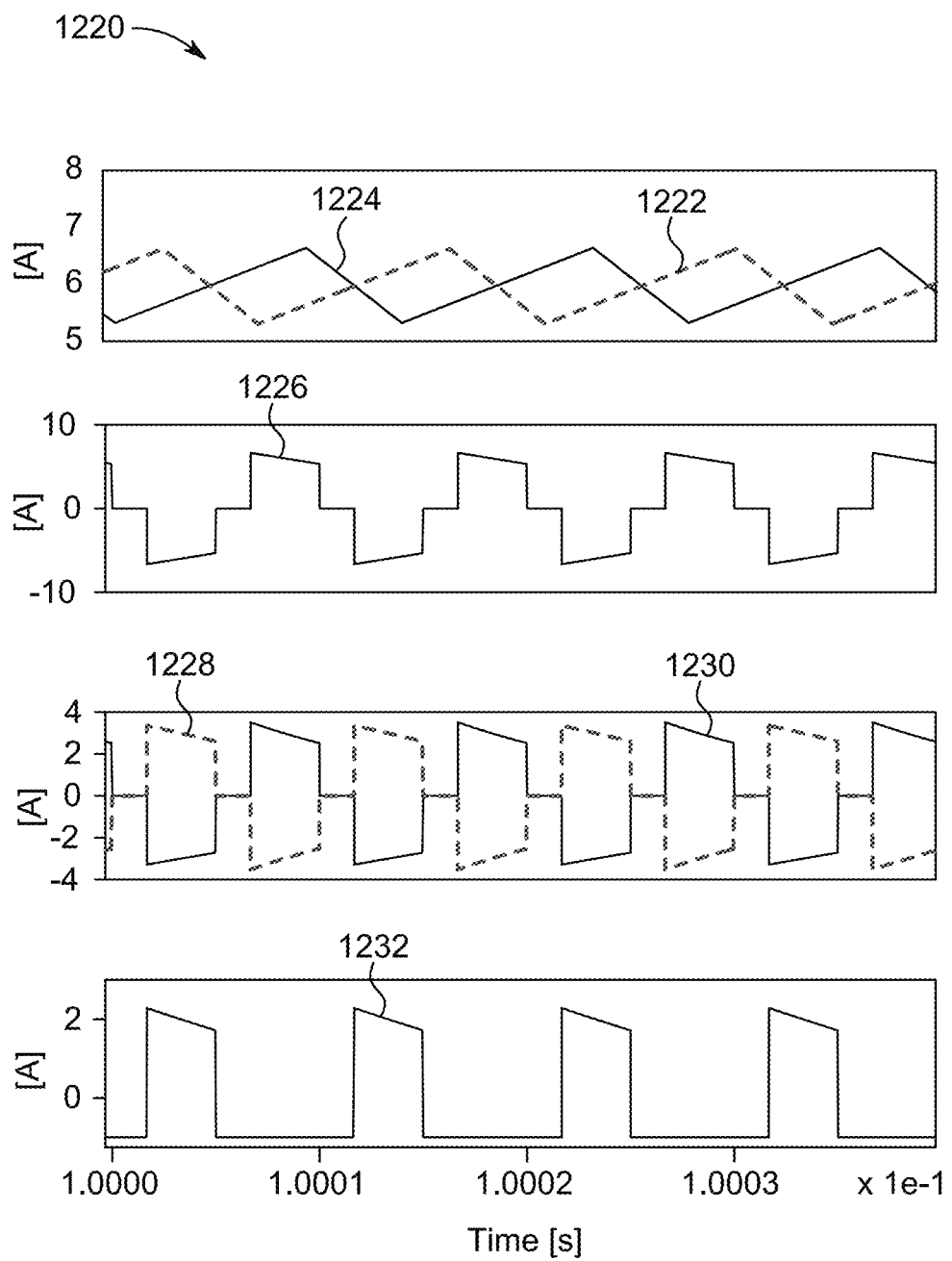
FIG. 12B depicts output results of the boost converter system for the inductors currents, capacitors currents, and the output capacitor current, according to aspects of the present disclosure.

FIG. 12B depicts output results 1220 of the boost converter system 200 at the waveforms of the inductors currents, capacitors currents, and the output capacitor current, according to aspects of the present disclosure. Signal 1222 represents current applied across the inductors L1 and L2 ($I_{L1}$ and $I_{L2}$). Signal 1224 represents current applied across the inductors L3 and L4 ($I_{L3}$ and $I_{L4}$). Signal 1226 represents current applied across capacitor $C_1$ ($I_{C1}$). Signal 1228 represents current applied across the capacitor $C_2$ ($I_{C2}$). Signal 1230 represents current applied across the capacitor $C_3$ ($I_{C3}$). Signal 1232 represents current applied across capacitor $C_o$ ($I_{Co}$).

As shown in FIG. 12A-FIG. 12B, the peak, average, and RMS values of all inductor currents are the same, which equals 6.79, 6.11, and 6.13 A, respectively. The input current's mean value is 20.2 A, and the RMS value of the input current equals 20.6. Other peak values of currents do not exceed the 10 A for diodes and capacitors and 20 for the controlled switches.

Figure 13A:
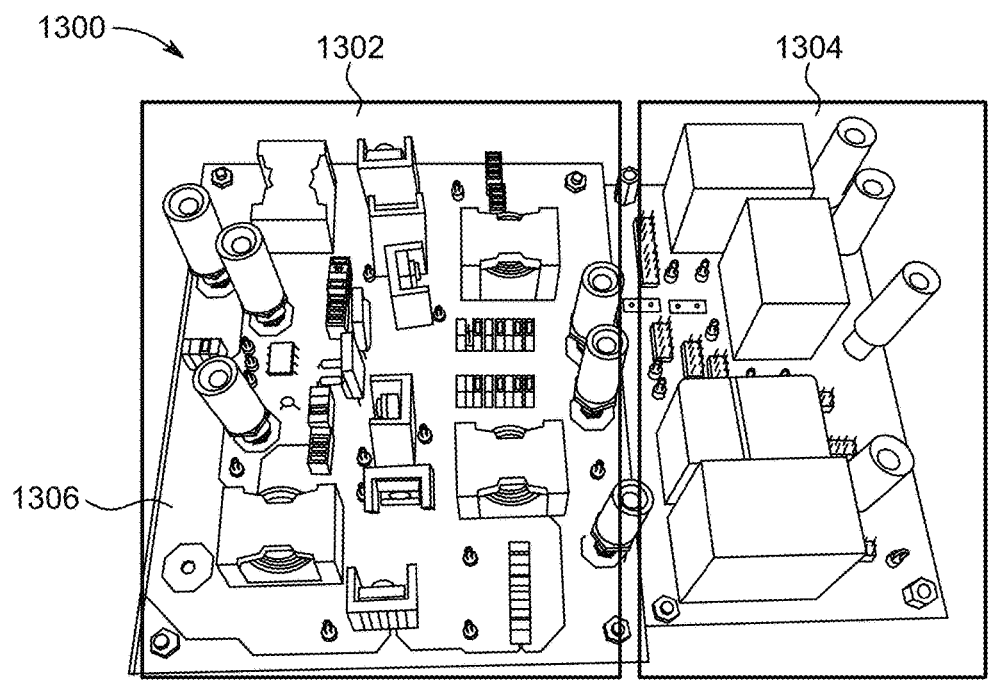
FIG. 13A is an experimental setup of the boost converter system, according to aspects of the present disclosure.

FIG. 13A is an experimental setup 1300 of the boost converter system 200, according to aspects of the present disclosure. Referring to FIG. 13A, the experimental setup 1300 includes a self-lift cell 1302, and a CW VMC 1304. The experimental setup 1300 was configured to generate 400 W as the output voltage.

The experimental setup 1300 was built in the laboratory to support the simulation results and validate the theory of operation. The prototype was constructed using the elements listed in table 7 and all elements were soldered on a 2-layer printed circuit board (PCB) 1306, as depicted in FIG. 13A. The boost converter system was constructed to convert a 20 V supplied from N5700 power supply to 400 V resistive load. The switches were implemented using IPA105N15N3 for MOSFETs and MBR40250G for diodes, and the storage elements used 60B104C for inductors and B32674D3106K for capacitors. The boost converter system 200 is configured to operate at 100 kHz, and both switches operate at a 0.67 duty cycle.

TABLE 7

Component Used in the experimental setup

| Component | Designation | Value | Manufacture No. |
|---|---|---|---|
| Inductor | $L_1$-$L_4$ | 0.1 mH, DCR = 0.025Ω, | 60 B104C |
| Capacitor | $C_1$, $C_2$, $C_3$, $C_o$ | 10 μF | B32674D3106K |
| MOSFET | $Q_1$, $Q_2$ | 150.0 V, 37.0 A $R_{ds(on)}$ = 10.5 mΩ | IPA105N15N3 |
| Diode | $D_{1b}$, $D_{2b}$ $D_{3b}$, $D_o$ | 250 V, 40 A $V_F$ = 0.85 V, $t_{rr}$ = 34.9 ns | MBR40250G |
| Resistor | $R_{load}$ | numerous values | ceramic resistors |

The experimental results are shown in FIG. 13B-FIG. 13F, where the potential stress on switches and currents passing through elements matches the simulation.

Figure 13B:
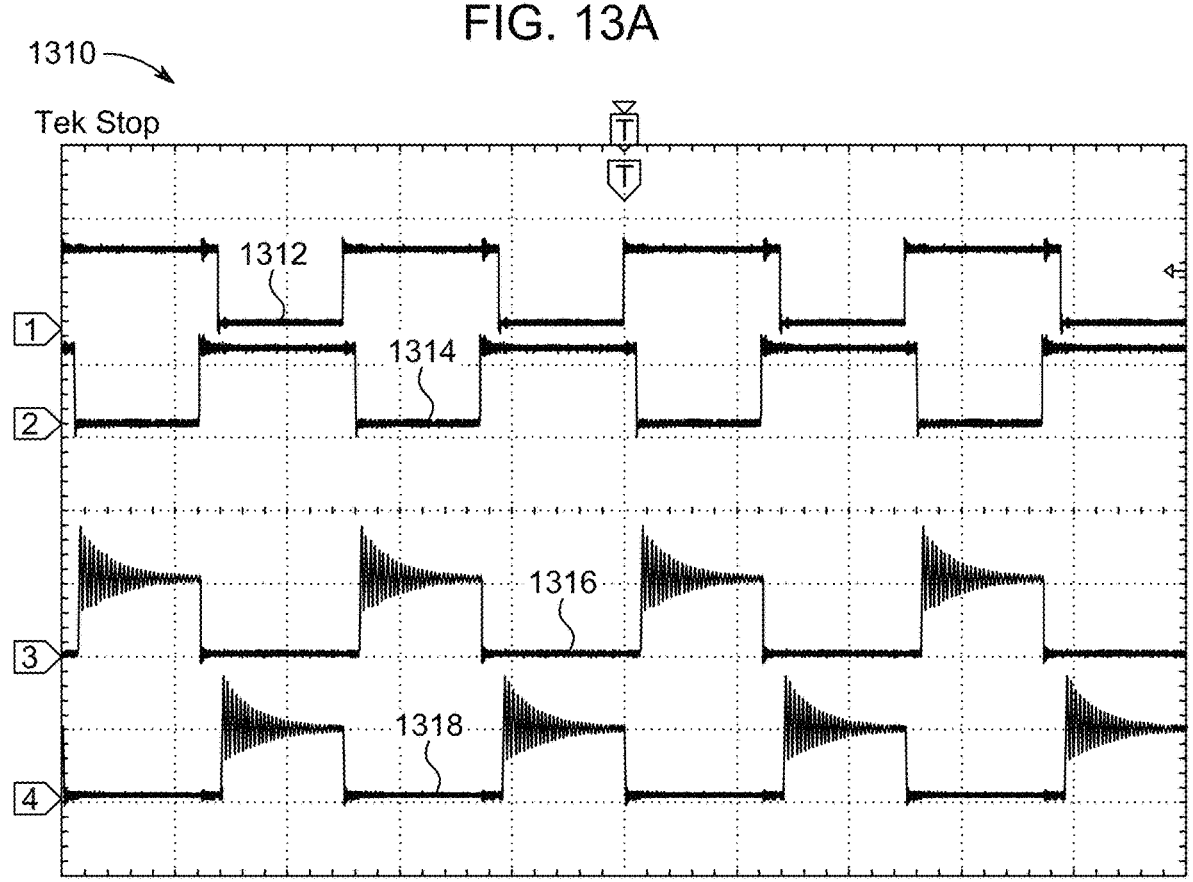
FIG. 13B is a representation of an experimental implementation and results of the boost converter system at potential stress across the switched inductor cells, according to aspects of the present disclosure.

FIG. 13B is a representation 1310 of an experimental implementation and results of the boost converter system 200 at potential stress on the controlled switches. Signal 1312 represents driving signal 1 and signal 1314 represents driving signal 2. Signal 1316 voltage across the second MOSFET $V_{Q2}$. Signal 1318 voltage across the first MOSFET $V_{Q1}$.

Figure 13C:
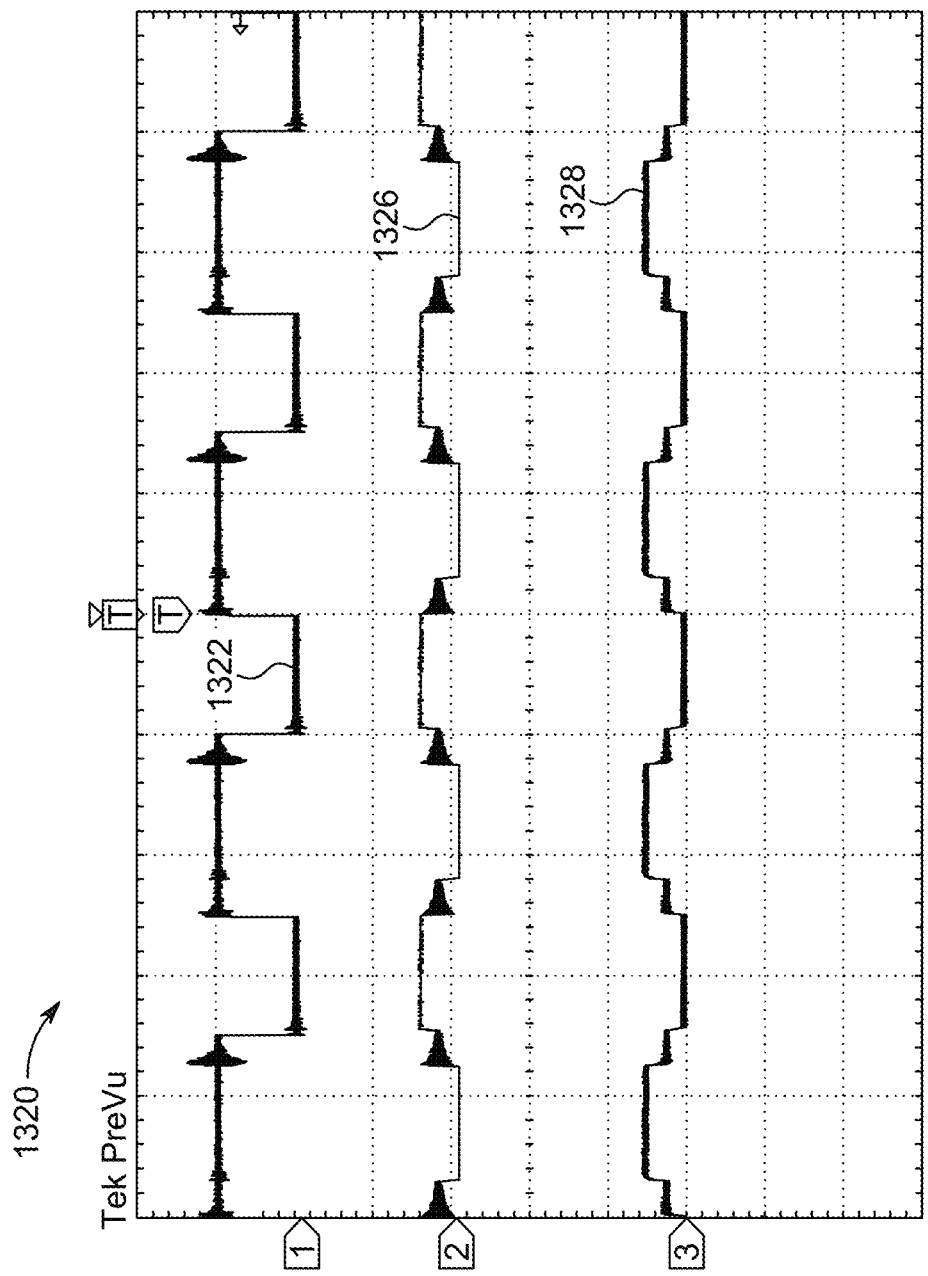
FIG. 13C is a representation of an experimental implementation and results of the boost converter system at potential stress across the selected diodes, according to aspects of the present disclosure.

FIG. 13C is a representation 1320 of an experimental implementation and results of the boost converter system 200 at potential stress on selected diodes. Signal 1322 represents driving signal 1. Signal 1326 represents voltage across the diode $D_{b1}$. Signal 1328 represents voltage across the diodes $D_{b2}$ and $D_{b3}$.

Figure 13D:
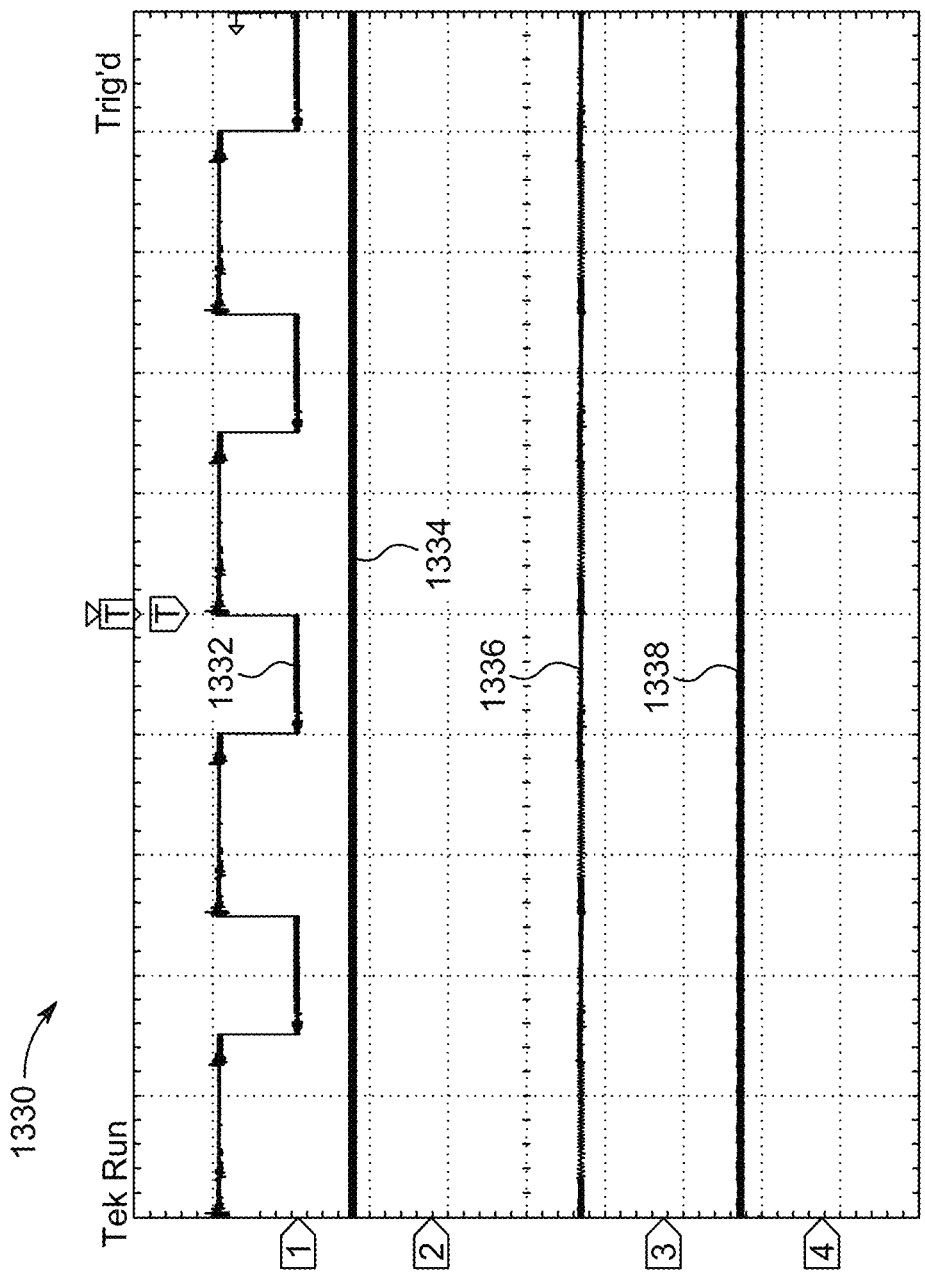
FIG. 13D is a representation of an experimental implementation and results of the boost converter system for the output voltage and capacitors voltage, according to aspects of the present disclosure.

FIG. 13D is a representation 1330 of an experimental implementation and results of the boost converter system 200 at the output voltage and voltage of the capacitors. Signal 1332 represents driving signal 1. Signal 1334 represents voltage applied across capacitor $C_1$ ($V_{C1}$). Signal 1336 represents voltage applied across the capacitors $C_2$ and $C_3$ ($V_{C2}$ and $V_{C3}$). Signal 1338 represents voltage applied across capacitor $C_o$ ($V_{Co}$).

Figure 13E:
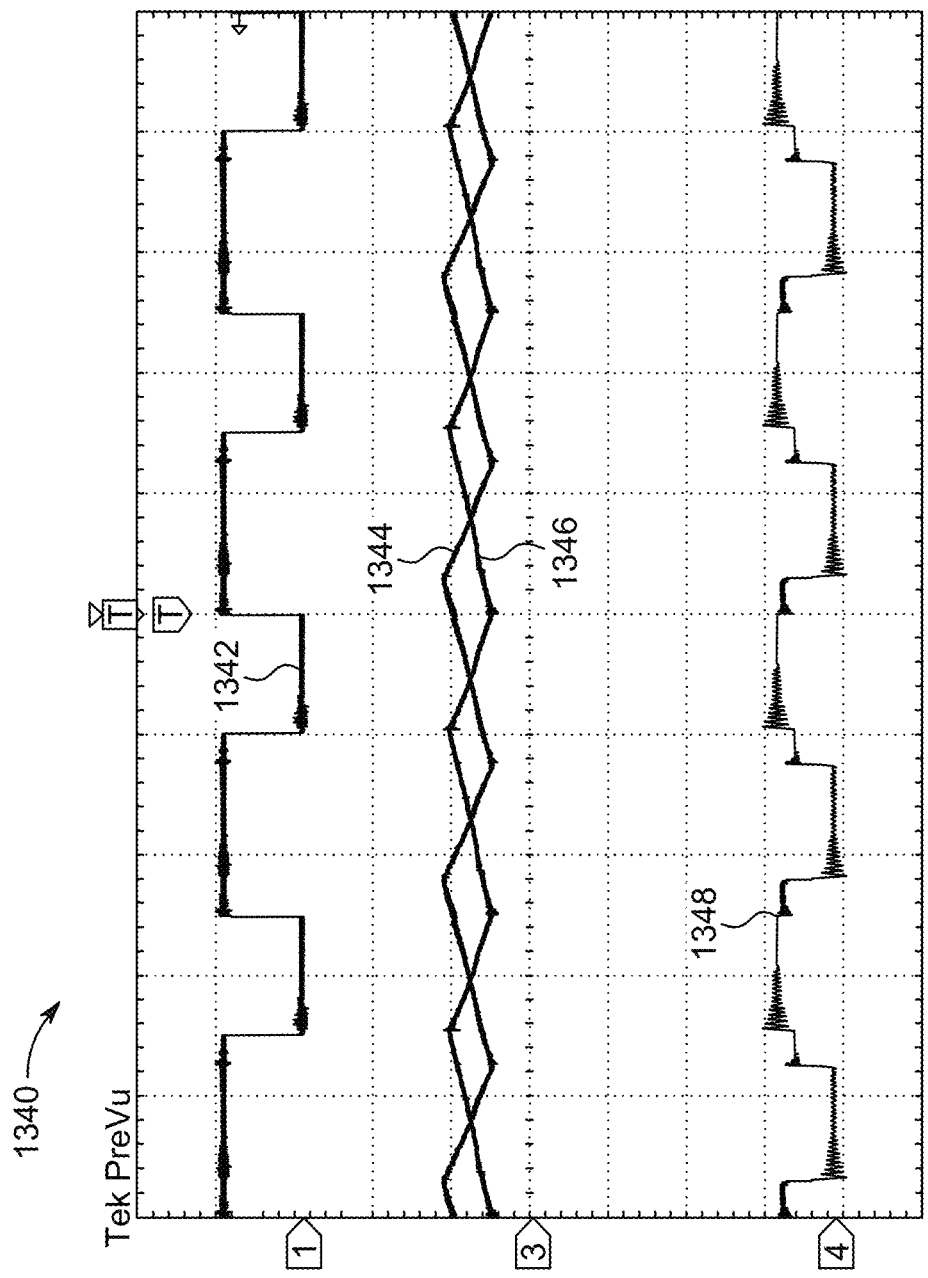
FIG. 13E is a representation of an experimental implementation and results of the boost converter system at various inductors and switch currents, according to aspects of the present disclosure.

FIG. 13E is a representation 1340 of an experimental implementation and results of the boost converter system 200 at inductors and switches currents. Signal 1342 represents driving signal 1. Signals 1344 and 1346 represent current applied across the inductors L1 and L2 ($I_{L1}$ and $I_{L2}$) respectively. Signal 1348 represents current applied across the second MOSFET.

Figure 13F:
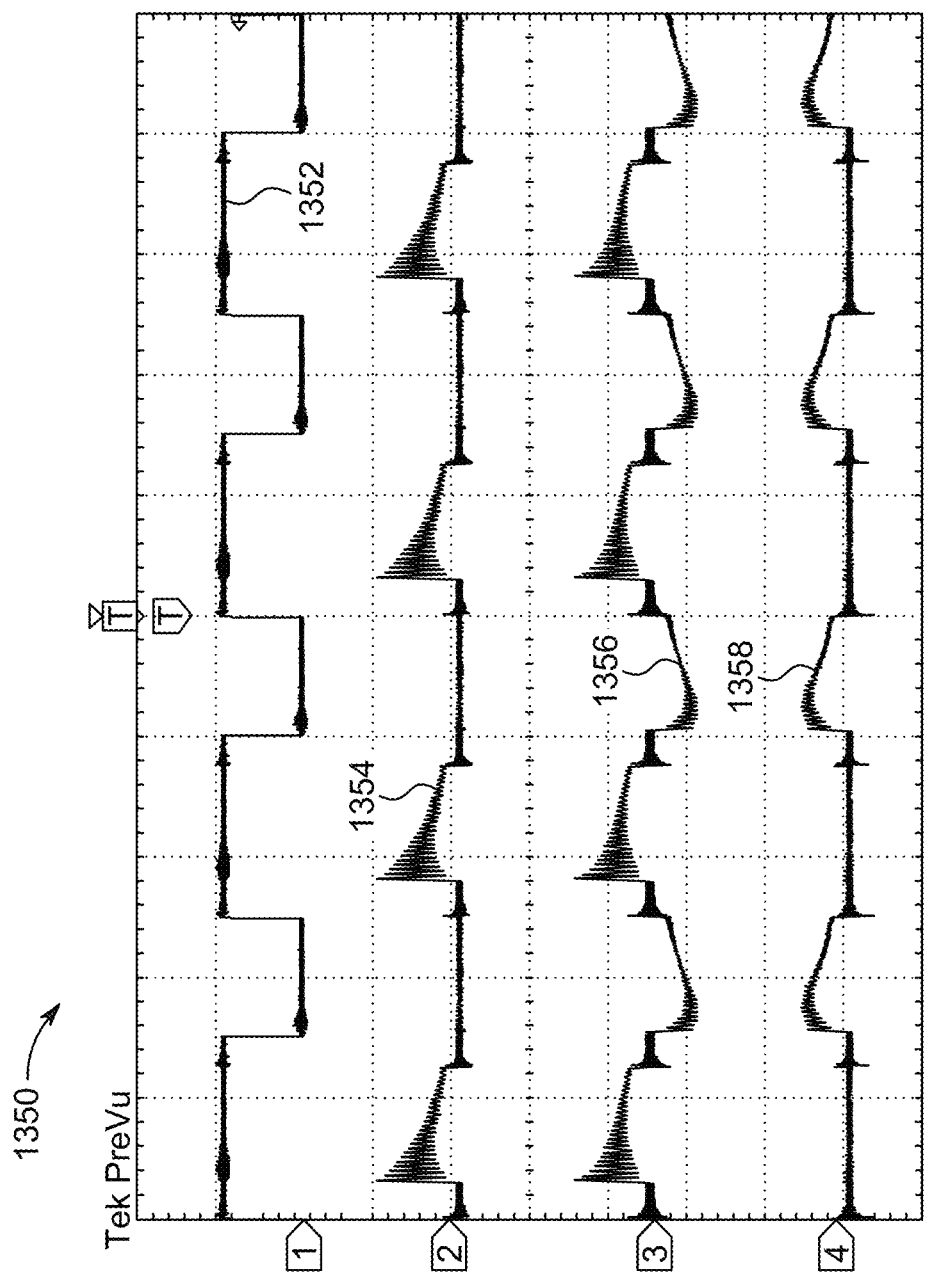
FIG. 13F is a representation of an experimental implementation and results of the boost converter system at capacitors currents, according to aspects of the present disclosure.

FIG. 13F is a representation 1350 of an experimental implementation and results of the boost converter system 200 at capacitors currents. Signal 1352 represents the driving signal 1. Signal 1354 represents current applied across the capacitor $C_1$. Signal 1356 represents current applied across the capacitor $C_2$. Signal 1358 represents current applied across the capacitor $C_3$.

Figure 14:
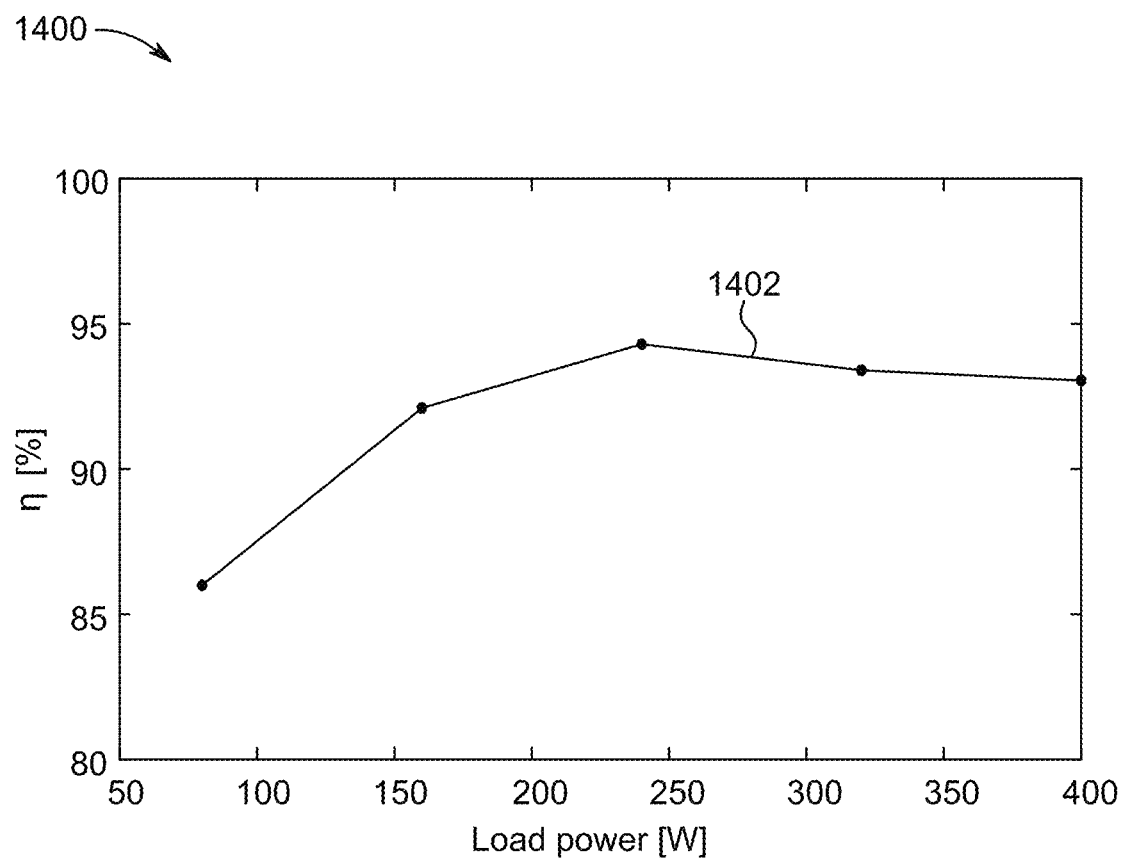
FIG. 14 is an illustration of efficiency vs. load power of the boost converter system, according to aspects of the present disclosure.

FIG. 14 is an illustration 1400 of efficiency vs load power of the boost converter system 200. Signals 1402 represents the efficiency of the boost converter system 200. In an example, the peak efficiency is about 94%. In an exemplary aspect, the hardware prototype dimensions are (5.7 in×4.3 in×1.2 in) and the power density is 13.7 W/in$^3$. The overall efficiency of the prototype is obtained by measuring the input and output voltages and currents, calculating the output and input power, and dividing the output power by the source power. FIG. 14 shows the efficiency curve versus the output load power. The maximum efficiency is about, which occurs at 220 W power. The loss breakdown by the components is 41.18% for diodes, 34.55% for switches, 22.4% for the inductors, and less than 2% for the capacitors.

In the present disclosure, an interleaved switched-inductor boost converter 600 with voltage multiplier cells is described to achieve high voltage gain. The boost converter system 200 can provide a 400 V out of low-voltage input source, with reduced potential stresses across components. The power efficiency of the boost converter is higher 90% for output loads above 80 W. The boost converter system 200 was implemented using silicon-based semiconductors, and the switching loss is significant if operating at a high switching frequency. The boost converter system 200 can perform highly efficiently if constructed using efficient components, such as wide bandgap devices.

Numerous modifications and variations of the present disclosure are possible in light of the above teachings. It is therefore to be understood that within the scope of the appended claims, the invention may be practiced otherwise than as specifically described herein.

The invention claimed is:

1. A boost converter system, comprising:
a power source, an inductor stage, and a voltage multiplication stage,
a power source outputting a first direct current (DC) to the inductor stage,
wherein the inductor stage includes a plurality of diodes and a plurality of inductors,
no capacitor or switching component being arranged in the inductor stage,
the plurality of diodes and the plurality of inductors being arranged in series,
wherein the inductor stage comprises a first switched inductor cell and a second switched inductor cell,
the first switched inductor cell being wired to a first metal-oxide-semiconductor field-effect transistor (MOSFET),
the first MOSFET being wired to the voltage multiplication stage,
the first DC current passing through the first switched inductor cell and across the first MOSFET,
the second switched inductor cell being wired to a second (MOSFET),
the second MOSFET being wired to the voltage multiplication stage,
the first DC current passing through the second switched inductor cell and across the second MOSFET,
the voltage multiplication stage receiving the first DC current from the first MOSFET and the second MOSFET,
wherein the voltage multiplication stage comprises at least one voltage multiplier cell (VMC),
the VMC comprising a plurality of diodes and plurality of capacitors,
the plurality of diodes and the plurality of capacitors being wired in parallel,
the first DC current passing through the plurality of diodes to the plurality of capacitors,
the first DC current creating a voltage charge in the plurality of capacitors,
the plurality of capacitors storing the voltage charge,
wherein the voltage charge generates a second DC current
the plurality of capacitors passing the second DC current to a grounded output,
wherein the grounded output comprises an output capacitor and a resistor,
the voltage charge being stored on the output capacitor.

2. The boost converter system of claim 1, where in the voltage multiplication stage produces a voltage gain.

3. The voltage gain of claim 2, wherein the range of a voltage output from the power source is between 10 volts and 40 volts,
wherein the voltage gain of the boost converter system is at least 400 volts.

4. The boost converter system of claim 1, wherein the inductor stage and the voltage multiplication stage are interleaved,
the voltage multiplier cell being wired in series to the inductor stage.

5. The boost converter system of claim 1, wherein the first switched inductor cell and the second switched inductor cell are wired in parallel to the power source.

6. The boost converter system of claim 1, wherein the first switched inductor cell and the second switched inductor cell are wired in series to the power source.

7. The boost converter system of claim 1, where the inductor stage comprises a plurality of non-isolated inductor cells.

8. The boost converter system of claim 1, wherein the power source comprises at least one photovoltaic panel,
the photovoltaic panel being wired to the switched inductor stage.

9. The boost converter system of claim 1, wherein the grounded output passes the second DC current to a plurality of micro-inverters.

10. The boost converter system of claim 1, wherein the inductor stage consists of six diodes and four inductors.

11. A DC/DC power converter providing a voltage gain using a self-lift cell and a plurality of VMC, the power converter comprising:
the self-lift cell performing a first storing sequence in a first mode according to a first out-of-phase driving signal and a second out-of-phase driving signal,
wherein the self-lift cell comprises a first loop and a second loop
the first storing sequence storing power in the first loop and the second loop,
wherein the self-lift cell comprises a plurality of inductors and a plurality of diodes,
no capacitor or switching component being arranged in the self-lift cell,
the self-lift cell performing a second storing sequence and a first discharging sequence in a second mode according to the first out-of-phase driving signal and the second out-of-phase driving signal,
the second storing sequence storing power in the second loop,
wherein the plurality of VMC comprises a plurality of capacitors and a plurality of diodes,
the plurality of VMC being electronically connected with the self-lift cell,
wherein the plurality of VMC receives power from the first discharging sequence of the self-lift cell,
the plurality of VMC being electronically wired to a grounded output,
the plurality of VMC performing a second discharging sequence,
wherein the grounded output receives power from the second discharging sequence of the plurality of VMC,
the grounded output performing a charging sequence
the grounded output storing the power of the plurality of VMC in the charging sequence,
the self-lift cell performing a third storing sequence and a third discharging sequence in a third mode according to the first out-of-phase driving signal and the second out-of-phase driving signal,
wherein the plurality of VMC receives power from the third discharging sequence of the self-lift cell,
the third storing sequence storing power in the first loop.

12. The DC/DC power converter of claim 11, wherein the plurality of VMC comprise a first capacitor, a second capacitor, and a third capacitor,
the first capacitor and the second capacitor discharging in the second mode,
the third capacitor charging in the second mode,
the first capacitor and the second capacitor charging in the third mode,
the third capacitor discharging in the third mode.

13. The DC/DC power converter of claim 11, wherein the grounded output comprises an output capacitor and an output resistor,
the output capacitor being charged in the second mode.

14. The DC/DC power converter of claim 11, wherein a current path is determined by a cycle of the first mode, the second mode, and the third mode,
wherein the cycle comprises:
the first mode, the second mode, the first mode, and the third mode,
the third mode returning to the first mode,
the cycle repeating,
the current path passing through the cycle.

15. The DC/DC power converter of claim 11, wherein a first switching component is set by the first out-of-phase driving signal and a second switching component is set by the second out-of-phase driving signal,
wherein the first out-of-phase driving signal and the second out-of-phase are in an active state, the first switching component and the second switching component are conducting,
wherein the first out-of-phase driving signal and the second out-of-phase are in an inactive state, the first switching component and the second switching component are not conducting,
the first out-of-phase-driving signal and the second out-of-phase driving signal being in the active state in the first mode,
the first out-of-phase-driving signal being in the inactive state and the second out-of-phase driving signal being in the active state in the second mode,
the first out-of-phase-driving signal being in the active state and the second out-of-phase driving signal being in the inactive state in the third mode.

16. The switching components of claim 15, wherein the first switching component and the second switching component comprise MOSFETs.

17. The DC/DC power converter of claim 11, wherein the self-lift cell consists of six diodes and four inductors.

18. A system for providing power to a DC network comprising:
a DC power system comprising a plurality of DC generation units providing generated power via an output terminal disposed on each of the DC generation units,
a power converter system comprising a plurality of boost power converter units,
wherein the power converter system receives power from the plurality of DC generation units connected to the output terminal, each boost power converter unit of the plurality of boost power converter units includes a power source, an inductor stage, and a voltage multiplication stage, the inductor stage includes a plurality of diodes and a plurality of inductors, no capacitor or switching component is arranged in the inductor stage, the voltage multiplication stage includes at least one voltage multiplier cell (VMC), and the VMC includes a plurality of diodes and a plurality of capacitors; and
a DC distribution system comprising a linked network configured to distribute power from the power converter system to the DC network.

19. The system for providing power to a DC distribution network of claim 18,
wherein the power source outputs a first direct current (DC) to the inductor stage,
wherein the plurality of diodes and the plurality of inductors included in the inductor stage are arranged in series,
wherein the inductor stage comprises a first switched inductor cell and a second switched inductor cell,
the first switched inductor cell being wired to a first metal-oxide-semiconductor field-effect transistor (MOSFET),
the first MOSFET being wired to the voltage multiplication stage,
the first DC current passing through the first switched inductor cell and across the first MOSFET,
the second switched inductor cell being wired to a second (MOSFET),
the second MOSFET being wired to the voltage multiplication stage,
the first DC current passing through the second switched inductor cell and across the second MOSFET,
the voltage multiplication stage receiving the first DC current from the first MOSFET and the second MOSFET,
wherein the plurality of diodes and the plurality of capacitors included in the VMC are wired in parallel,
the first DC current passing through the plurality of diodes to the plurality of capacitors,
the first DC current creating a voltage charge in the plurality of capacitors,
the plurality of capacitors storing the voltage charge,
wherein the voltage charge generates a second DC current,
the plurality of capacitors passing the second DC current to a grounded output,
wherein the grounded output comprises an output capacitor and a resistor,
the voltage charge being stored on the output capacitor.

20. The system for providing power to a DC distribution network of claim 18, wherein the inductor stage consists of six diodes and four inductors.

* * * * *